US012730421B2

(12) United States Patent
Nabi et al.

(10) Patent No.: US 12,730,421 B2
(45) Date of Patent: Sep. 8, 2026

(54) REDUCED ORDER MODELING AND CONTROL OF HIGH DIMENSIONAL PHYSICAL SYSTEMS USING NEURAL NETWORK MODEL

(71) Applicant: Mitsubishi Electric Research Laboratories, Inc., Cambridge, MA (US)

(72) Inventors: Saleh Nabi, Cambridge, MA (US); Aleksei Sholokhov, Cambridge, AL (US); Hassan Mansour, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 772 days.

(21) Appl. No.: 18/184,065

(22) Filed: Mar. 15, 2023

(65) Prior Publication Data

US 2024/0310795 A1 Sep. 19, 2024

(51) Int. Cl.

| | |
|---|---|
| ***G05B 13/02*** | (2006.01) |
| ***G06N 3/0455*** | (2023.01) |
| ***G06N 3/08*** | (2023.01) |

(52) U.S. Cl.

CPC ......... *G05B 13/027* (2013.01); *G06N 3/0455* (2023.01); *G06N 3/08* (2013.01)

(58) Field of Classification Search

CPC ....... G05B 13/027; G06N 3/0455; G06N 3/08

See application file for complete search history.

(56) References Cited

U.S. PATENT DOCUMENTS

| | | | | |
|---|---|---|---|---|
| 11,162,701 B2 | | 11/2021 | Nabi et al. | |
| 2007/0198104 | A1* | 8/2007 | Sayyarrodsari ...... | G05B 13/042 700/44 |
| 2018/0259978 | A1* | 9/2018 | Dweik ................... | G16H 30/40 |
| 2021/0191348 | A1* | 6/2021 | Lee ...................... | G05B 13/047 |

* cited by examiner

*Primary Examiner* — Gary Collins

(74) *Attorney, Agent, or Firm* — Gene Vinokur

(57) ABSTRACT

A system and method are provided for training neural network for controlling operation of system having non-linear dynamics represented by partial differential equations (PDEs). The method comprises collecting digital representation of time series data indicative of instances of function space of the system and measurements of state of the operation of the system. Collocation points corresponding to solutions of the PDE are generated. The neural network is trained using training data including the collected time series data and the collocation points to train parameters of non-linear operator. The neural network has autoencoder architecture including encoder to encode each instance of the training data into latent space, the non-linear operator to propagate the encoded instances into the latent space with transformation determined by parameters of the non-linear operator, and decoder to decode the transformed encoded instances of the training data to minimize a hybrid loss function.

20 Claims, 17 Drawing Sheets

200A
Control apparatus 202
Control unit 206 (Estimation and Control Commands)
Non-linear operator 110
System 204

REDUCED ORDER MODELING AND CONTROL OF HIGH DIMENSIONAL PHYSICAL SYSTEMS USING NEURAL NETWORK MODEL

TECHNICAL FIELD

The present disclosure relates generally to system modeling, prediction and control, and more particularly to systems and methods of reduced order modeling and control of high dimensional physical systems using neural network model.

BACKGROUND

Control theory in control systems engineering is a subfield of mathematics that deals with the control of continuously operating dynamical systems in engineered processes and machines. The objective is to develop a control policy for controlling such systems using a control action in an optimum manner without delay or overshoot and ensuring control stability.

Conventionally, some methods of controlling the system are based on techniques that allow a model-based design framework in which the system dynamics and constraints may directly be considered. Such methods may be used in many applications to control the systems, such as the dynamical systems of various complexities. Examples of such systems may include production lines, car engines, robots, numerically controlled machining, motors, satellites, and power generators.

Further, a model of dynamics of a system or a model of a system describes dynamics of the system using differential equations. However, in a number of situations, the model of the system may be nonlinear and may be difficult to design, to use in real-time, or it may be inaccurate. Examples of such cases are prevalent in certain applications such as robotics, building control, such as heating ventilating and air conditioning (HVAC) systems, gas leakage detection, smart grids, factory automation, transportation, self-tuning machines, and traffic networks. In addition, even if a nonlinear model may be available, designing an optimal controller for control of the system may essentially be a challenging task.

Moreover, in absence of accurate models of the dynamical systems, some control methods exploit operational data generated by dynamical systems in order to construct feedback control policies that stabilize the system dynamics or embed quantifiable control-relevant performance. Typically, different types of methods of controlling the system that utilize the operational data may be used. In an embodiment, a control method may first construct a model of the system and then leverage the model to design the controllers. However, such methods of control result in a black box design of a control policy that maps a state of the system directly to control commands. However, such a control policy is not designed in consideration of the physics of the system.

In another embodiment, a control method may directly construct control policies from the data without an intermediate model-building step for the system. A drawback of such control methods is potential requirement of large quantities of data in the model-building step. In addition, the controller is computed from an estimated model, e.g., according to a certainty equivalence principle, but in practice the models estimated from the data may not capture the physics of dynamics of the system. Hence, a number of control techniques for the system may not be used with constructed models of the system.

To that end, to address the aforesaid issues, there exists a need for a method and a system for controlling the system in an optimum manner.

SUMMARY

The present disclosure provides a computer-implemented method and a system of reduced order modeling and control of high dimensional physical systems using a neural network model.

It is an object of some embodiments to train the neural network model, such that the trained neural network model may be utilized for controlling the operation of the system having nonlinear dynamics represented by partial differential equations (PDEs). The neural network model possesses an autoencoder architecture that may include an encoder, a linear predictor (such as a linear operator) and a decoder. In some embodiments, the linear predictor may be based on a Koopman operator.

In other embodiments the neural network model possesses the autoencoder architecture that may include the encoder, a non-linear predictor (such as a non-linear operator) and the decoder. In an implementation, the non-linear predictor may be based on one of intrusive or nonintrusive model of high-dimensional dynamics of the system. For example, the linear operator or the nonlinear operator may be based on a reduced-order model (ROM).

In order to generate an intrusive ROM, reduced solutions of the system may be determined by solving the reduced order model, i.e., a projection of an original model onto a reduced space. In some embodiments, a proper orthogonal decomposition (POD)-Galerkin projection method may be utilized to generate the intrusive ROM. In such a case, a singular value decomposition (SVD) may be applied to snapshot matrix of data of the dynamics of the system, and the POD basis may be extracted. Further, the intrusive ROM may be constructed by applying the Galerkin projection.

Traditionally, the POD-Galerkin projection based model reduction is intrusive since numerical implementation of the reduced models require access to discretized PDE operators. The intrusive nature of such ROM techniques limits a scope of traditional model reduction methods. A major drawback of such intrusive methods includes requirement of access to a full model. Moreover, solvers may typically be unavailable when working with, and thus the traditional intrusive model reduction methods may be inapplicable when proprietary software is used for solving the PDEs, where the details of governing equations of the dynamics of the system are unknown.

In order to generate the non-intrusive ROM, the reduced models may be learnt from snapshots, i.e., either numerical approximations or measurements of states of the dynamical systems, when the operators of the discretized systems are unavailable. In an embodiment, a machine learning model may be used to analyze an underlying process of generating the non-intrusive ROM.

It is another object of some embodiments to generate a model of dynamics of the system that capture physics of behavior of the system. In such a manner, the embodiments simplify model design process of the system, while retaining advantages of having the model of the system in designing control applications.

Accordingly, one embodiment discloses a computer-implemented method of training a neural network model for controlling an operation of a system having nonlinear dynamics represented by partial differential equations (PDEs). The neural network includes a non-linear operator of the dynamics of the system represented in a latent space by parameterized ordinary differential equations (ODEs) with parameters determined by the training. The computer-implemented method may include collecting a digital representation of time series data indicative of measurements of the operation of the system at different instances of time. The computer-implemented method may further include generating collocation points corresponding to solutions of the PDE that represents the non-linear dynamics for a set of initial and boundary conditions on the state of the operation of the system and constraints on the operation of the system evolving from the boundary conditions according to the PDEs. The computer-implemented method may further include training the neural network using training data including the collected time series data and the collocation points to train the parameters of the non-linear operator. The neural network includes an autoencoder architecture including an encoder configured to encode each instance of the training data into a latent space, a non-linear operator configured to propagate the encoded instances of the training data into the latent space with transformation determined by the parameters of the non-linear operator, and a decoder configured to decode the transformed encoded instances of the training data to minimize a hybrid loss function including data-driven loss between the decoding of the neural network and the collected time series data and physics-informed loss between the decoding of the neural network and solutions of the PDEs at the collocation points. In an embodiment, the non-linear operator may be the reduced order model. Such ROMs may be useful in accurate representation of the system having the having nonlinear dynamics. Such low order non-linear operators or predictors may be designed such that it conforms to desired properties, e.g., linearity and being of reduced order, stability, nonlinearity while respecting laws of physics, etc. of the system.

In some embodiments, generating the parameterized ODEs may be based on one or more model reduction techniques. The one or more model reduction techniques may include at least one of proper orthogonal decomposition (POD)-Galerkin projection method, or dynamic mode decomposition (DMD) method. In order to be suitable for control, the ROM training method needs to find a low-dimensional manifold and a dynamics that together may yield both high-accuracy predictions and long-term stability. Generally, the ROMs are projection-based, e.g., dynamic mode decomposition (DMD) and POD that may transform the trajectories of a high-dimensional dynamical system into a suitable and an optimal low-dimensional subspace. One challenge for the POD methods is their intrusive nature, i.e., requiring access to the solver codes. To overcome such a drawback, the operator inference approaches utilize Singular Value Decomposition (SVD)-based model reduction and exploit lifting to fit the latent space dynamics data of the system into polynomial, for example, quadratic models. Such polynomial models, however, may be limited in representation power (up to quadratic, e.g., for lift and learn approach) and may require a custom-tailored SVD-based optimization technique.

In some embodiments to overcome such challenges, autoencoder-based reduced-order models may be used as the non-linear ROM technique, that may yield both accurate and stable ROMs. However, the autoencoder-based ROMs require datasets that densely cover a hypothetical infinite dimensional phase portrait of the dynamical system. Large demand for data significantly limits the use of such models in physics applications where the data may be expensive to obtain.

In some embodiments, the method may further include controlling the system by using a linear or a non-linear control law. To that end, some embodiments are based on the recognition that a model of the system may be represented with a nonlinear reduced order model. For example, in case the full physics-based model of the system is typically captured by the PDE, the ROM may be represented by an ordinary differential equation (ODE). The ODE may represent dynamics of the system as a function of time, but less accurately than the representation of dynamics using PDE. Additionally, or alternatively, some embodiments use a model of the system determined by the data-driven adaptation in various model based predictive controls, e.g., Model Predictive Control (MPC). Such embodiments may allow to take advantage from ability of the MPC to consider constraints in control of the system. However, linearity may not be expressive enough for complex dynamics of the system with multiple basins of attraction. In dynamical systems, a 'basin of attraction' is a set of all the starting points or initial conditions, usually close to one another, that arrive at the same final state as the system evolves through time, that may be referred as an equilibrium. On the other hand, the non-linear model reduction method may use the projection technique to derive low-cost approximate models of the non-linear systems.

In an embodiment, a residual factor of the PDE is based on a Lie operator. The method further comprises performing eigen-decomposition to the Lie operator. The residual factor of such Lie operator may be used to learn the dynamics of either the linear or the non-linear model at the latent space.

In some embodiments, the digital representation of the time series data may be obtained by use of computational fluid dynamics (CFD) simulation or experiments. The CFD simulations and experiments are high fidelity computations for obtaining the digital representation of the time series data. The CFD simulation or experiments enables improvement in an accuracy and speed of complex simulation scenarios such as transonic or turbulent fluid flows in case of various applications of the systems such as heating ventilating and air conditioning (HVAC) applications to describe an airflow.

In some embodiments, the non-linear operator is based on the reduced-order model. While the field of model reduction is mature for linear systems, reducing the non-linear model may be a challenge. For example, the POD method may be used to reduce the non-linear model. To make the resulting reduced models computationally efficient, the POD method may be combined with a sparse sampling methods (also called "hyper-reduction"). For example, the sparse sampling methods may include a missing point estimation (MPE) method, an empirical interpolation method (EIM), a discrete empirical interpolation method (DEIM), a Gappy POD method, or a Gauss-Newton with approximated tensors (GNAT) method. Other methods for nonlinear model reduction use data-driven approaches via dynamic mode decomposition (DMD) and Operator Inference. More recently, certain input-independent model reduction methods such as balanced truncation and the iterative rational Krylov algorithm (IRKA) have been extended to quadratic-bilinear systems.

In an embodiment, the parameters of the non-linear operator are determined based on a probabilistic approach. The probabilistic approach may assume that measured data of the system is random with probability distribution dependent on the parameters of interest.

In another embodiment, the non-linear operator is based on a continuous-time dynamical system. In some embodiments, the non-linear operator may be approximated at the latent space by use of a data-driven approximation technique. The data-driven approximation technique may be generated using numerical or experimental snapshots.

In some embodiments, the non-linear operator may be approximated by use of a deep learning technique. The deep learning technique may lead to non-linear embedding of the original dynamics of the system with significantly lower order. The deep learning technique for the approximation of the nonlinear may be successful in long-term dynamic predictions of the system and control of the system.

In some embodiments, the parameters of the non-linear operator may be fine-tuned in real-time, based on a set of expected measurements and an output of the neural network. Once the ROM is trained, the neural network may be used for reconstruction of the original dynamics of the system. Such ROM output may be projected into appropriate measurement output based on a measurement model. Moreover, a difference between real measurements (such as the set of expected measurements) and the output of the neural network may be used for fine tuning the parameters of the ROM.

In some embodiments, the generation of the collocation points may be based on a subset of the set of initial and boundary conditions with a structure reducing a complexity of solving the PDE and a functional space of the system satisfying the subset of the initial and boundary conditions. In some embodiments, the structure of the subset of the initial and boundary conditions includes at least one of sinusoidal functions, harmonic functions, periodic functions, or exponential functions. The collocation points may be samples extracted from a domain of function space of the system, such that in case of the PDEs, the collocation points also satisfy boundary conditions or other constraints associated with the system. Advantageously, the generation of the collocation points is computationally cheaper compared to computation of snapshots of the CFD computations.

In some embodiments, the estimation and control commands may be generated for controlling the operation of the system. In one or more embodiments, the generation of the estimation and control commands for controlling the operation of the system is based on a data-driven based control and estimation technique or an optimization-based control and estimation technique. Such techniques may be advantageous for control of the dynamic system. For example, the model-based control and estimation technique allows a model-based design framework in which the system dynamics and constraints may directly be considered.

In some embodiments, generation of the estimation and control commands for controlling the operation of the system is based on a data-driven based control and estimation technique. The objective of the data-driven based control and estimation technique is to design a control policy for the system from data and to use the data-driven control policy to control the system.

Another embodiment discloses a training system for training of training a neural network for controlling an operation of a system having non-linear dynamics represented by partial differential equations (PDEs). The neural network may include a non-linear operator of the dynamics of the system represented in a latent space by parameterized ordinary differential equations (ODEs) with parameters determined by the training. The training system may include at least one processor; and a memory having instructions stored thereon that, when executed by the at least one processor, cause the training system to collect a digital representation of time series data indicative of instances of a function space of the system and corresponding measurements of a state of the operation of the system at different instances of time. The training system may further generate collocation points corresponding to solutions of the PDE that represents the non-linear dynamics for a set of initial and boundary conditions on the state of the operation of the system and constraints on the operation of the system evolving from the boundary conditions according to the PDEs. Further, the training system may train the neural network using training data including the collected time series data and the collocation points to train the parameters of the non-linear operator. The neural network has an autoencoder architecture including an encoder configured to encode each instance of the training data into a latent space, the non-linear operator configured to propagate the encoded instances of the training data into the latent space with transformation determined by the parameters of the non-linear operator, and a decoder configured to decode the transformed encoded instances of the training data to minimize a hybrid loss function including data-driven loss between the decodings of the neural network and the collected time series data and physics-informed loss between the decodings of the neural network and solutions of the PDEs at the collocation points.

Yet another embodiment discloses a non-transitory computer readable storage medium embodied thereon a program executable by a processor for performing a method for controlling an operation of a system having non-linear dynamics represented by partial differential equations (PDEs). The neural network may include a non-linear operator of the dynamics of the system represented in a latent space by parameterized ordinary differential equations (ODEs) with parameters determined by the training. The method may include collecting a digital representation of time series data indicative of measurements of the operation of the system at different instances of time. The method may further include generating collocation points corresponding to solutions of the PDE that represents the non-linear dynamics for a set of initial and boundary conditions on the state of the operation of the system and constraints on the operation of the system evolving from the boundary conditions according to the PDEs. The method may further include training the neural network using training data including the collected time series data and the collocation points to train the parameters of the non-linear operator. The neural network includes an autoencoder architecture including an encoder configured to encode each instance of the training data into a latent space, a non-linear operator configured to propagate the encoded instances of the training data into the latent space with transformation determined by the parameters of the non-linear operator, and a decoder configured to decode the transformed encoded instances of the training data to minimize a hybrid loss function including data-driven loss between the decoding of the neural network and the collected time series data and physics-informed loss between the decoding of the neural network and solutions of the PDEs at the collocation points.

The nonlinearity in the latent space (or the non-linear operator) plays an important role in the development of non-intrusive ROMs. For example, in case the original system may include several basins of attraction, a finite dimensional approximation of the linear operator at the latent space may not be able to find various equilibrium of the system. Moreover, the linear operator, which may approximate the Koopman operator, may not be compressed in the latent space. The advantage of the non-linear operator in the latent space is that on one hand it may construct a unified model where several basins of attractions are present and on the other hand, due to nonlinearity, it may result in a ROM that may be more accurate for a given order of reduction (or alternatively for a given accuracy it can result in lower order model).

In some embodiments, the non-linear ROM may be generated. In other embodiments, lift and learn approach may be utilized for nonlinear model reduction, enabled by data-driven learning of the reduced model through structure-preserving lens of projection. The lift and learn approach typically has two key ingredients, i.e . . . , data-driven learning of the reduced model via operator Inference, and variable transformations and lifting to expose system polynomial structure. However, such non-linear model reductions may use inductive bias, e.g., assuming the ROM model should be quadratic or polynomial, which may not be a most efficient scenario.

In the present disclosure, the generation of the non-intrusive ROM is proposed, that may not require access to the original, finite element or finite volume solver to determine the dynamics of the system.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

DETAILED DESCRIPTION

Figure 1A:
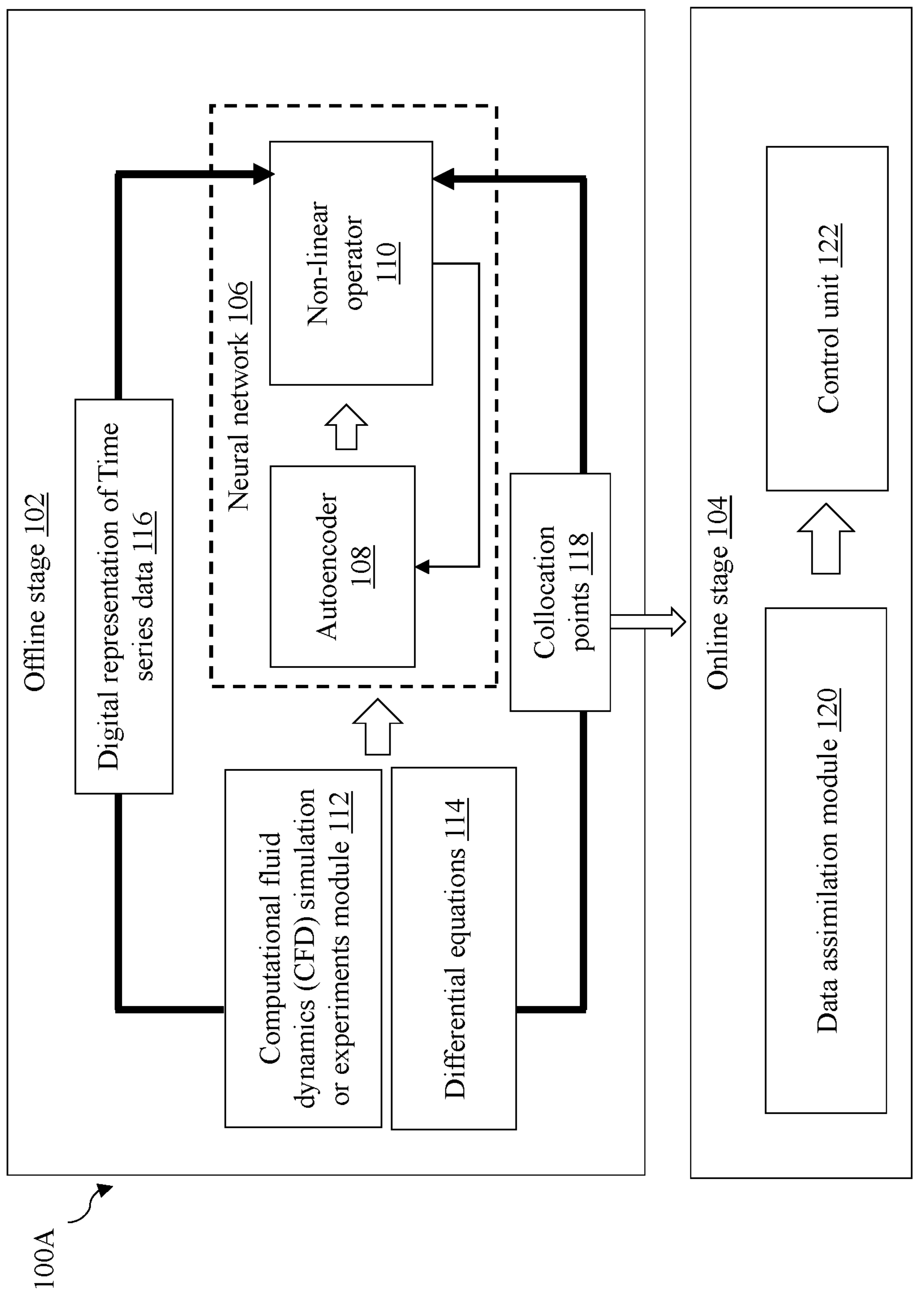
FIG. 1A illustrates a block diagram of two stages to train a neural network in an offline stage to be used in an online stage of controlling an operation of a system, according to an embodiment of the present disclosure.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

In describing embodiments of the disclosure, the following definitions are applicable throughout the present disclosure. A "control system" or a "controller" may be referred to a device or a set of devices to manage, command, direct or regulate the behavior of other devices or systems. The control system can be implemented by either software or hardware and can include one or several modules. The control system, including feedback loops, can be implemented using a microprocessor. The control system can be an embedded system.

An "air-conditioning system" or a heating, ventilating, and air-conditioning (HVAC) system may be referred to a system that uses a vapor compression cycle to move refrigerant through components of the system based on principles of thermodynamics, fluid mechanics, and/or heat transfer. The air-conditioning systems span a broad set of systems, ranging from systems which supply only outdoor air to the occupants of a building, to systems which only control the temperature of a building, to systems which control the temperature and humidity.

A "central processing unit (CPU)" or a "processor" may be referred to a computer or a component of a computer that reads and executes software instructions. Further, a processor can be "at least one processor" or "one or more than one processor".

FIG. 1A shows a block diagram 100A of two stages to train a neural network model in an offline stage, to be used in an online stage of controlling an operation of a system, according to an embodiment of the present disclosure. The block diagram 100A may include the two stages, such as an offline stage 102 and an online stage 104. The block diagram 100A depicts control and estimation of large-scale systems, such as the system having non-linear dynamics represented by partial differential equations (PDEs) using a two-stage apparatus, i.e., the offline stage 102 and the online stage 104.

The offline stage 102 (or a stage I) may include a neural network 106. The neural network 106 has an autoencoder architecture. The neural network 106 comprises an autoencoder 108 that includes an encoder and a decoder. The neural network 106 further includes a non-linear operator 110 of the dynamics of the system represented in a latent space by parameterized ordinary differential equations (ODEs) with parameters determined by training of the neural network 106. The offline stage 102 may further include a computational fluid dynamics (CFD) simulation or experiments module 112, differential equations 114 for representation of the non-linear dynamics of the system, a digital representation of time series data 116 and collocation points 118. The time series data may represent a temporal evolution of a vector field, such as, a wind velocity field as it evolves over time due to an initial condition and a boundary condition or due to an external forcing force. Alternatively, the time series data may represent a temporal change in the spatial distribution of a density of an entity such as a liquid, a concentration of a crowd of people, a flock of birds or a school of fish. The online stage 104 (or a stage-II) may include a data assimilation module 120 and a control unit 122 to control the system.

In the offline stage 102, an offline task for the control and estimation of the system may be carried out to derive the non-linear operator 110 (or the non-linear predictor). In some embodiments, the non-linear operator 110 may be based on a reduced-order model (ROM). For example, the ROM may be represented by a neural ordinary differential equation (NODE) operator. Such ROM may be referred as a latent-space model. In general, a dimension of the latent space is desired to be significantly smaller than the input. Details of an architecture of the non-linear operator 110 to represent the ROM at the latent space are further provided, for example, in FIG. 1B.

Typically, data for development of the latent-space model (represented by the non-linear operator 110) may be generated by performing high fidelity CFD simulation and experiments by use of the CFD simulation or experiments module 112.

Generally, the CFD refers to a branch of fluid mechanics that may utilize numerical analysis and data structures to analyze and solve problems that may involve fluid flows. For example, computers may be used to perform calculations required to simulate a free-stream flow of the fluid, and an interaction of the fluid (such as liquids and gases) with surfaces defined by boundary conditions. Further, multiple software has been designed that improves an accuracy and a speed of complex simulation scenarios associated with transonic or turbulent flows that may arise in applications of the system, such as the HVAC applications to describe the airflow in the system. Furthermore, initial validation of such software may typically be performed using apparatus such as wind tunnels. In addition, previously performed analytical or empirical analysis of a particular problem related to the airflow associated with the system may be used for comparison in the CFD simulations.

In some embodiments, the digital representation of the time series data 116 is obtained by use of the CFD simulation or experiments module 112. The CFD simulation or experiments module 112 may output a dataset, such as the digital representation of the time series data 116 that may be utilized to develop the latent-space model (or the non-linear operator 110). The non-linear operator 110 may be constructed for several trajectories generated by the CFD simulations. In an exemplary scenario, the HVAC system may be installed in a room. The room may have various scenarios, such as a window may be open, a door may be closed, and the like. The CFD simulations may be performed for the room where the window is closed, the window is opened, the number of occupants is one, two or multiple, and the like. In such a case, the autoencoder 108 may be valid for all such conditions associated with the room. The tasks such as the CFD simulations may be carried in the offline stage 102.

In some embodiments, the collocation points 118 associated with a function space of the system, may be generated based on the PDE, the digital representation of time series data 116 and a nonlinearly transformed encoded digital representation (such as an output of the non-linear operator 110). The neural network 106 may be trained based on the generated collocation points 118. Specifically, the neural network 106 may be trained based on a difference between the prediction of the non-linear operator 110 and the dataset such as the digital representation of the time series data 116 plus a physics-informed part i.e., the differential equations 114 for representation of the non-linear dynamics of the system, which generates the collocation points 118.

Furthermore, an output of the neural network 106 may be utilized by the data assimilation module 120 of the online stage 104. The data assimilation module 120 may output, for example, reconstructed models of temperature and velocity in an area, such as the room associated with the system, such as the HVAC system. The reconstructed models of temperature and velocity may be utilized by the control unit 122. The control unit 122 may generate control commands to control the operations (such as an airflow) of the system, such as the HVAC system.

The data assimilation module 120 utilizes a process of data assimilation that refers to assimilation of exact information from sensors with a possibly inexact model information. For example, the room may be installed with the sensors to monitor certain sensory data. Examples of the sensory data, installed within the room for the HVAC applications, include, but may not be limited to, thermocouple reading, thermal camera measurements, velocity sensor data, and humidity sensor data. The information from the sensors may be assimilated by the data assimilation module 120.

Typically, the data assimilation refers to a mathematical discipline that may seek to optimally combine predictions (usually in the form of a numerical model) with observations associated with the system. The data assimilation may be utilized for various goals, for example, to determine an optimal state estimate of the system, to determine initial conditions for a numerical forecast model of the system, to interpolate sparse observation data using knowledge of the system being observed, to identify numerical parameters of a model from observed experimental data, and the like. Depending on the goal, different solution methods may be used.

It may be noted that the offline stage 102 and the online stage 104 are examples of development of simplified and robust neural network 106, that in turn may be used for estimation and control of the system having non-linear dynamics by the control unit 122. Typically, the estimation and control of the system involves estimating values of parameters of the non-linear operator 110 based on measured empirical data that may have a random component. The parameters describe an underlying physical setting in such a way that the value of the parameter may affect distribution of the measured data. Moreover, an estimator, such as the control unit 122 attempts to approximate unknown parameters using the measurements. Generally, two approaches are considered for the approximation. In accordance with an embodiment, the parameters of the non-linear operator 110 for approximation may be determined based on a probabilistic approach. The probabilistic approach may assume that the measured data of the system is random with probability distribution dependent on the parameters of interest. In some embodiments, the parameters of the non-linear operator 110 for approximation may be determined based on a set-membership approach that may assume that the measured data vector belongs to a set which depends on the parameter vector.

In some embodiments a severe challenge of utilizing ROMs of the non-linear operator 110 may arise due to poor out-of-distribution performance, especially when it is difficult for a user to obtain data that covers an entire distribution of possible data inputs. In an exemplary scenario, in the HVAC applications, the data may be collected from a room with two windows but not from one room for every possible number of windows. In such thermofluidic applications, experiments may be conducted on a certain parameter, however the experiments may be difficult to conduct on all parameters. In such situations, embedding knowledge of physics into the model of the system becomes necessary to improve extrapolation performance.

For instance, some embodiments determine an underlying structure of the nonlinear dynamical system from data using symbolic regression. In other embodiments, symbolic regression may be employed in conjunction with graph neural network (GNN), while encouraging sparse latent representation, to extract explicit physical relations of the system. Generally, the symbolic expressions extracted from the GNN generalized to out-of-distribution data better than the GNN. However, the symbolic regression also suffers from excessive computational costs, and may be prone to overfitting. Typically, the symbolic regression is a type of regression analysis that searches a space of mathematical expressions to find the model that best fits a given dataset, both in terms of accuracy and simplicity. No particular model is provided as a starting point for symbolic regression. Instead, initial expressions are formed by randomly combining mathematical building blocks such as mathematical operators, analytic functions, constants, and state variables.

Moreover, the GNN are a class of artificial neural networks for processing data that can be represented as graphs. Generally, certain existing neural network architectures may be interpreted as GNNs operating on suitably defined graphs. Convolutional neural networks, in the context of computer vision, may be seen as a GNN applied to graphs structured as grids of pixels. Transformers, in the context of natural language processing, may be seen as GNNs applied to complete graphs whose nodes are words in a sentence.

It may be noted that by incorporating knowledge of the physics informed part or the differential equations associated with the system, a need for large training datasets, such as the digital representation of time series data 116 for identifying the non-linear operator 110 may be reduced. Moreover, since the neural network 106 performs operator learning, it enables the neural network 106 to predict beyond a training horizon, and it may further be used for compressed sensing, estimation, and control of the system.

Another example of incorporating physics in ROMs is use of parametric models at the latent space, e.g., by using the sparse identification of nonlinear dynamics (SINDy), relying on a fact that most dynamical systems of interest have relatively few nonlinear terms in the dynamics out of a family of possible terms (i.e., polynomial nonlinearities, etc.). Such a method may utilize sparsity promoting techniques to find the models that automatically balance sparsity in a number of terms with model accuracy. For example, some embodiments may use a chain-rule based loss that ties latent-space derivatives to observable-space derivatives for simultaneous training of the autoencoder 108 and the latent dynamics of the non-linear operator 110. However, such chain-rule based loss may be sensitive to noise in data, especially when evaluating time-derivatives with finite differences is required. Collocation-based enforcement of the physics, i.e., projection of candid functions in the governing equations to enforce the chain rule instead of finite difference may address such numerical difficulties. Moreover, Neural ODE (NODE) may be utilized to fit an arbitrary non-linear model (e.g. a network) as a latent space dynamics model (or the non-linear operator 110), significantly extending the set of models for the latent dynamics that may be trained efficiently.

The computer-implemented method of the present disclosure employs autoencoders to perform nonlinear model reduction along with the NODE at the latent space to model complex and nonlinear dynamics. Such a method is used to reduce a demand for data and improve overall forecasting stability of the system under challenging training conditions as an objective. In order to achieve the objective, collocation methods of numerical analysis to embed knowledge from a known governing equation into the latent-space dynamics of the ROM is used, as described in FIG. 1B.

Figure 1B:
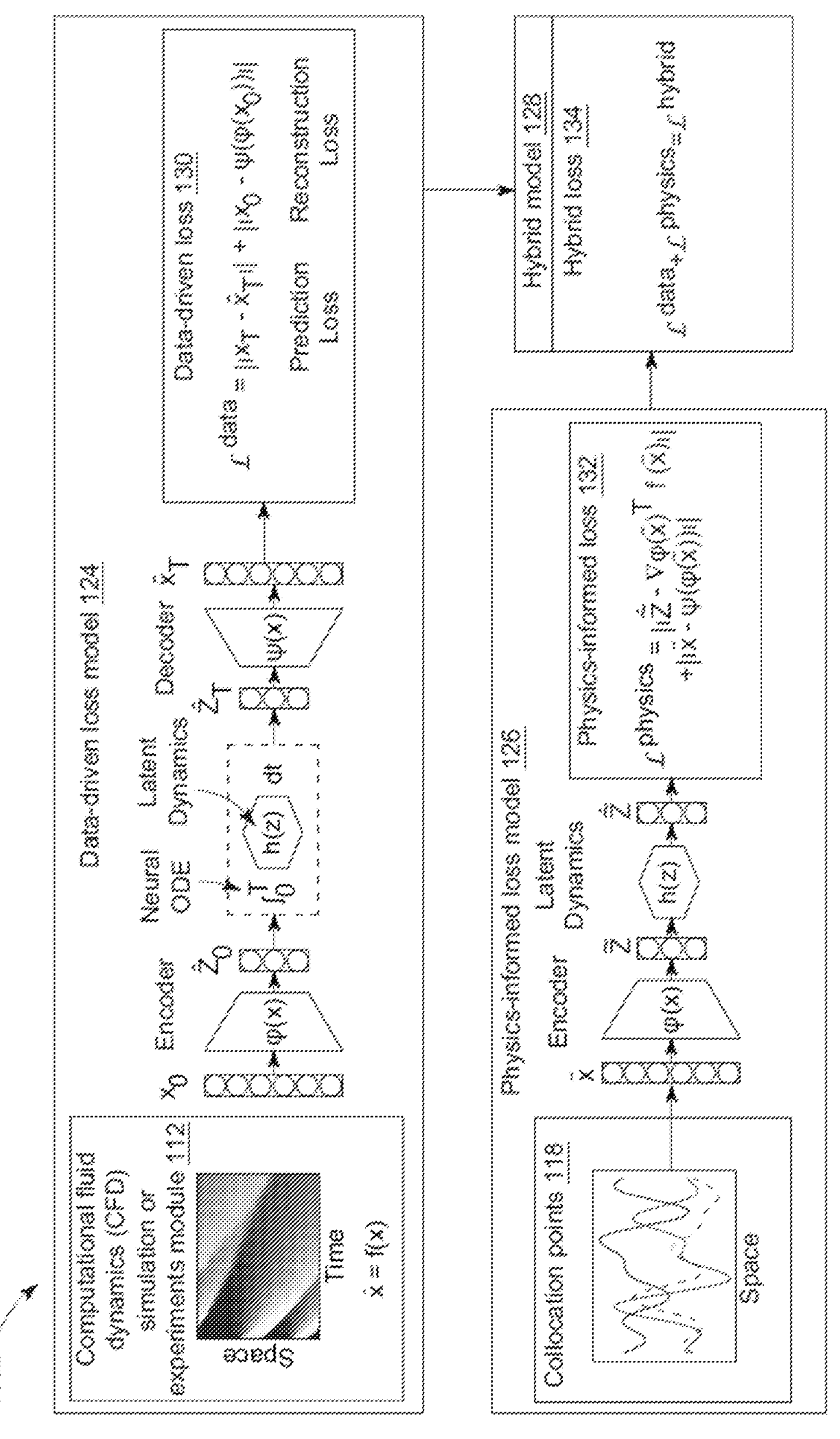
FIG. 1B illustrates a schematic diagram of architecture of a nonlinear operator of the neural network, according to some embodiments of the present disclosure.

The non-linear operator 110 of the neural network 106 may be represented by the NODE, as described in FIG. 1B.

FIG. 1B shows a schematic diagram 100B of architecture of the non-linear operator 110 represented by the NODE, according to some embodiments of the present disclosure. The schematic diagram 100B shows the nonlinear ROM for the latent space. The schematic diagram 100B may include a data-driven loss model 124, a physics-informed loss model 126 and a hybrid model 128. The data-driven loss model 124 shows a data-driven loss ($L^{data}$) 130. The physics-informed loss model 126 shows a physics-informed loss ($L^{physics}$) 132. The hybrid model 128 shows a hybrid loss ($L^{hybrid}$) 134.

The method of training the neural network 106 may include collecting the digital representation of time series data 116. The digital representation of time series data 116 indicates instances of a function space of the system and corresponding measurements of a state of the operation of the system at different instances of time. The collection of the digital representation of time series data 116 by the CFD simulation or experiments module 112 is further described, for example, in FIG. 1A.

The method may further include generating the collocation points 118 corresponding to solutions of the PDE that represents the non-linear dynamics for a set of initial and boundary conditions on the state of the operation of the system and constraints on the operation of the system evolving from the boundary conditions according to the PDEs. In some embodiments, the generation of the collocation points 118 may be based on a subset of the set of initial and boundary conditions with a structure reducing a complexity of solving the PDE. The generation of the collocation points 118 may be further based on a functional space of the system satisfying the subset of the initial and boundary conditions. Details of the generation of the collocation points 118 are further provided, for example, in FIG. 1D.

The method of training the neural network 106 may further include training the neural network 106 using training data including the collected digital representation of the time series data 116 and the collocation points 118 to train the parameters of the non-linear operator 110. The encoder (w) of the autoencoder 108 may be configured to encode each instance of the training data into a latent space. Further, the non-linear operator (h) 110 may be configured to propagate the encoded instances of the training data into the latent space with transformation determined by the parameters of the non-linear operator 110. The decoder ($\psi^{-1}$) of the autoencoder 108 may be configured to decode the transformed encoded instances of the training data to minimize a hybrid loss function (corresponding to the hybrid loss 134) including the data-driven loss 130 between the decodings of the neural network 106 and the digital representation of the time series data 116 and the physics-informed loss 132 between the decodings of the neural network 106 and solutions of the PDEs at the collocation points 118.

In some embodiments, the non-linear operator 110 may be based on a continuous-time dynamical system. Considering the continuous-time dynamical system as follows:

$$\frac{dx}{dt} = f(x) \tag{1}$$

with $x \in X \subseteq R^n$. Further, a time-t flow map operator $F^t: X \rightarrow X$ is defined as:

$$x(t_0 + t) = F^t(x(t_0)) \tag{2}$$

Typically, equation (1) may be difficult to solve directly because the function x(t) may be very high-dimensional. However, many physical systems evolve on a manifold $Z\square R^m$ of a lower dimension m<<n, more specifically, the manifold Z is defined by a parametric representation of an m-dimensional space which is a subset of the total n-dimensional space of Real numbers over which the observations are defined, with m being much small than n. In such a lower dimensional space, the dynamics evolve according to a function h(z) that may be unknown. The dynamics of the function h(z) may be represented as:

$$\frac{dz}{dt} = h(z(t)) \tag{3}$$

where the space X is an observable space, and the space Z is a latent space. When an invertible mapping $\Psi: Z \rightarrow X$ between the observable space and the latent space is known, the dynamics of the system x may be predicted at a future time T by projecting the initial condition x(0) into the latent space, performing an integration, and mapping a resulting trajectory back to the observable space X. Such mapping is described as follows:

$$z(0) = \psi^{-1}(x(0)) \tag{3a}$$

$$z(T) = z(0) + \int_0^T h(z(t))dt \tag{3b}$$

$$x(T) = \psi(z(T)) \tag{3c}$$

When m<<n, a triplet ($\Psi$, $\psi^{-1}$, h) may be referred as the ROM of the system in equation 1. Generally, for a given system f there exists no ROM ($\Psi$, $\psi^{-1}$, h) such that the relationship depicted in equation 3 holds exactly. In such a case, an approximation ROM ($\Psi_\theta^*$, $\varphi_\theta^*$, $h_\theta^*$) may be utilized that minimizes a difference between the data x(t) and the prediction $\hat{x}(t)$ over a chosen class of models ($\Psi_\theta$, $\varphi_\theta$, $h_\theta$) parameterized by $\theta$, where $\theta$ represents the set of all parameters of the ROM.

In practical applications of the system, usage of the ROMs may be necessary instead of integrating the equation 1 directly. For example, integrating the equation 1 may be computationally intractable on platforms with limited computing capability such as embedded and autonomous devices. For instance, in the HVAC systems, solving equation 1 means solving a Navier-Stocks equation on a fine grid in real time, which may exceed computing capabilities of the processor of the HVAC system. On the other hand, integrating the equation 3 may be cheap when m<<n. Finally, even when solving the equation 1 may be possible in real time (e.g., by utilizing a remote cluster), executing control over the resulting model, which is an end-goal for an HVAC system, may still be intractable. Indeed, executing control requires multiple iterative evaluations of the equation 1 for each iteration of control.

Proposed is the model with triplets, such as the encoder ($\Psi$), the decoder ($\psi^{-1}$), and the non-linear operator (h) 110 with fully connected neural networks ($\Psi_\theta$), ($\varphi_\theta$), and ($h_\theta$), respectively. Specifically, the pair ($\Psi$, $\psi^{-1}$) is modelled with an autoencoder ($\Psi_\theta$, $\varphi_\theta$), such as the autoencoder 108, and h is modelled with a fully connected network ($h_\theta$) of the neural network 106. With reference to FIG. 1B, the encoder ($\Psi$), the decoder ($\psi^{-1}$), and the non-linear operator (h) 141 are all neural networks whose parameters are trained, auto tuned, and inferred based on active learning disclosed. Such parameters are trained based on both the data-driven loss 130 and the physics-informed loss 134. Once trained, the triplets ($\Psi_\theta$, $\varphi_\theta$, $h_\theta$) are used to approximate the latent space model, i.e., the non-linear operator 110 of the neural network 106.

The data-driven loss ($L^{data}$) 130 may be defined as a sum of reconstruction loss and prediction loss. The reconstruction loss ensures that de and We are inverse mappings of each other, whereas the prediction loss matches the model's predictions to the available data. Formally, for a given set of trajectories $x_i$, $i \in [1 \ldots k]$, where each trajectory $x_i \in R_n \times p$ is a set of "p" snapshots that correspond to the recorded states of the system for p time-steps, $t_j$, j□[1, . . . , p], a loss function $$L_\theta^{data}$$

is defined as:

$$L_\theta^{data} = \frac{1}{2\sigma^2} \sum_{i=1}^{k} \left[ \frac{\omega_1}{p} \sum_{j=1}^{p} |x_i(t_j) - \psi_\theta(\phi_\theta(x_i(t_j)))|^2 + \frac{\omega_2}{p} \sum_{j=1}^{p} \left| \psi_\theta\left(\phi_\theta\left(x_i(t_1) + \int_{t_i}^{t_j} h(z(t))dt\right)\right) - x_i(t_j) \right|^2 \right] \quad (4)$$

where σ is a standard deviation of an observation noise. It may be noted that each trajectory "$x_i$" may be captured over its own timeframe and use a distinct, possibly non-uniform, step-size, in which case the loss function should be modified accordingly. To simplify the notation without loss of generality, all trajectories that are recorded are assumed over the same timeframe with an equal and uniform step-size.

Using a chain rule, the following equation is considered:

$$\frac{dz}{dt} = \frac{dz}{dx}\frac{dx}{dt} = \nabla\phi(x(t))^T \cdot f \quad (5)$$

On the other hand, by the definition of Ψ and h, it may be considered that:

$$\frac{dz}{dt} = h(\phi(x(t))) \quad (6)$$

Combing equation 5 and 6 as follows:

$$h(\phi(x(t))) = \nabla\phi(x(t))^T \cdot f \quad (7)$$

Equation 7 links the dynamics h(z) and the encoder φ(x) with the known equation f(x) and is true for all z□Z and x□X. Hence, knowledge of the function f may be assimilated into the model by evaluating the equation 7 on a set of N sampled points $\bar{x}_i$ □X, i□[1, . . . , N].

Further, the physics-informed loss ($L^{physics}$) 132 may be defines as:

$$L_\theta^{physics} = \sum_{i=1}^{N} \left[ \frac{\omega_3}{N} |h_\theta(\phi_\theta(\bar{x}_i)) - \nabla\phi_\theta(\bar{x}_i) \cdot f(\bar{x}_i)|^2 + \frac{\omega_4}{N} |\bar{x}_i - \psi_\theta(\phi_\theta(\bar{x}_i))|^2 \right] \quad (8)$$

Notably, the NODE is employed to represent the non-linear operator ($h_\theta$) 110. The NODEs are neural network models that generalize standard layer to layer propagation to continuous depth models. Starting from an observation that a forward propagation in neural networks is equivalent to one step of discretization of an ODE, the models may be constructed and effectively trained via the ODEs. On top of providing a novel family of architectures, notably for invertible density models and continuous time series, the NODEs may further provide a memory efficiency gain in supervised learning tasks.

In numerical analysis of the ODEs, Runge-Kutta methods are a family of implicit and explicit iterative methods, which include an Euler method, used in temporal discretization for the approximate solutions of simultaneous nonlinear equations, such as the ODEs. In mathematics and computational science, the Euler method (also called a forward Euler method) is a first-order numerical procedure for solving the ODEs with a given initial value. The Euler method is a basic explicit method for numerical integration of the ODEs and is the simplest Runge-Kutta method.

Furthermore, Residual Networks (ResNets) may be utilized to train the deep networks. The ResNets may be used to approximate the ODEs and provide training approaches for the neural network 106. Any residual network may be seen as an Explicit Euler's method discretization of a certain ODE, given the network parameters, and any numerical ODE solver may be used to evaluate an output layer of the neural network 106. The adjoint method may further be used to efficiently back-propagate (and thus train) the neural network 106. Such method may further be used to train time-continuous normalizing flows. In such a case, using continuous formulation allows avoidance of the computation of the determinant of a Jacobian, that is one of a major bottlenecks of normalizing flows of the system. The NODEs may also be used to model latent dynamics in time-series modeling, allowing easy tackling of irregularly sampled data.

The training task to learn the autoencoder 108 and the neural network 106, that together comprises the ROM, the digital representation of the time series data 116 and the collocation points 118 may be utilized using the data-driven loss ($L^{data}$) 130 and the physics-informed loss ($L^{physics}$) 132. The non-linear operator 110 is trained and represented as a NODE denoted by $h_\theta$.

The collocation points 118 may be defined as pair ($\bar{x}$, f ($\tilde{x}$)). The collocation points 118 are samples from the space X×Im f(X), that should satisfy three conditions. For example, the conditions may be simplicity, representativeness and feasibility. The simplicity condition $f(\bar{x}_j)$ should be computationally cheap to evaluate. Typically, the simplicity function may involve high-order derivatives, thus may require cheap evaluation. The representativeness function $\bar{x}_j$ should cover the space of states where the aim is to improve the model's performance or stability. The collocation points 118 that a model might encounter and that are not represented by data snapshots are the best candidates. The feasibility may be represented as $\bar{x}_j$ □X. In other words, x; may be an attainable state of the system. The collocation points 118 outside of the system X may downgrade the performance of the autoencoder 108 by forcing it to be an invertible function on a domain outside of X where a true mapping Ψ operates on. Thus, an optimal sampling procedure for the collocations $\bar{x}_j$ is domain-specific and may be designed given a particular system f and available data $x_i$.

Proposed are the collocation points 118 that differs from conventional collocation points in terms of sample space.

For example, instead of sampling from a spatiotemporal domain as done conventionally, the collocation points 118 of the present disclosure are sampled from an appropriate function space. The selection of the collocation points 118 are further explained in FIG. 1D.

Figure 1C:
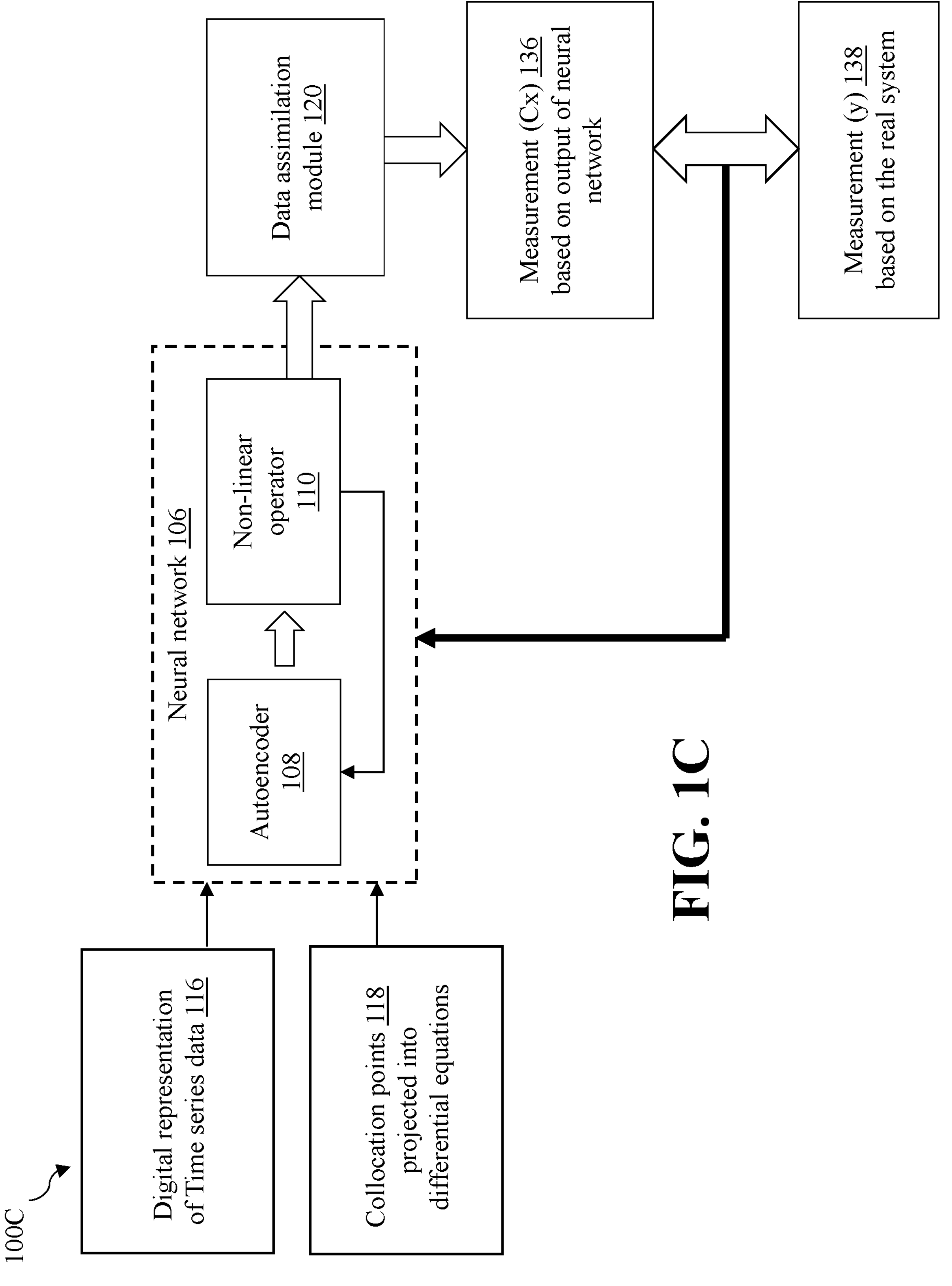
FIG. 1C illustrates a block diagram for fine-tuning parameters of the non-linear operator in real-time for training the neural network, according to some embodiments of the present disclosure.

FIG. 1C illustrates fine-tuning of the parameters of the neural network 106 to minimize the hybrid loss 134.

FIG. 1C illustrates a block diagram 100C for fine-tuning parameters of the non-linear operator 110 in real-time for training the neural network 106. The block diagram 100C may include the digital representation of the time series data 116, the collocation points 118, the neural network 106, and the data assimilation module 120. The block diagram 100C may further include measurements 136 based on output of the neural network 106 and measurements 138 based on output of the system.

The training of the neural network 106 may be performed as described in FIG. 1A and FIG. 1B based on available data trajectories, such as the digital representation of the time series data 116 and the collocation points 118. Once the neural network 106 (ROM) is trained, the model may be used for reconstruction of the original dynamic quantities by the data assimilation module 120. Such model output may be projected into appropriate measurement output (such as the measurements (C(x)) 136) based on measurement model. Moreover, there may be measurements (such as the measurements (y) 138) available from the system. In some embodiments, the parameters of the non-linear operator 110 may be fine-tuned in real-time, based on a set of expected measurements (such as the measurements 138) and the output of the neural network 106, such as the measurements 136. For example, a difference between the 136 based on output of the neural network 106 and the measurements 138 of the system may be used for fine tuning the parameters of the ROM (i.e., the neural network 106), or in particular the triplet (Ψθ, φθ, and hθ) explained in FIG. 1B.

It may be noted that the measurement model shows the relationship between a sensor data output and state variables of the system. The simplest model is linear for which such relationship may be represented by a measurement matrix. The state trajectory may be measured during online functioning of the system. For example, the apparatus (or the training system) may include an input interface configured to acquire measurement data from sensors arranged in the HVAC system, e.g., velocity and temperature data of the system. In such a case, the measurement matrix has a size that corresponds to "a number of sensors" multiplied by "a number of original dynamics n", where entries of the measurement matrix are "0" where the sensor is not located the entries of the measurement matrix are "1", where the sensor is located, in the physical domain of the system.

Figure 1D:
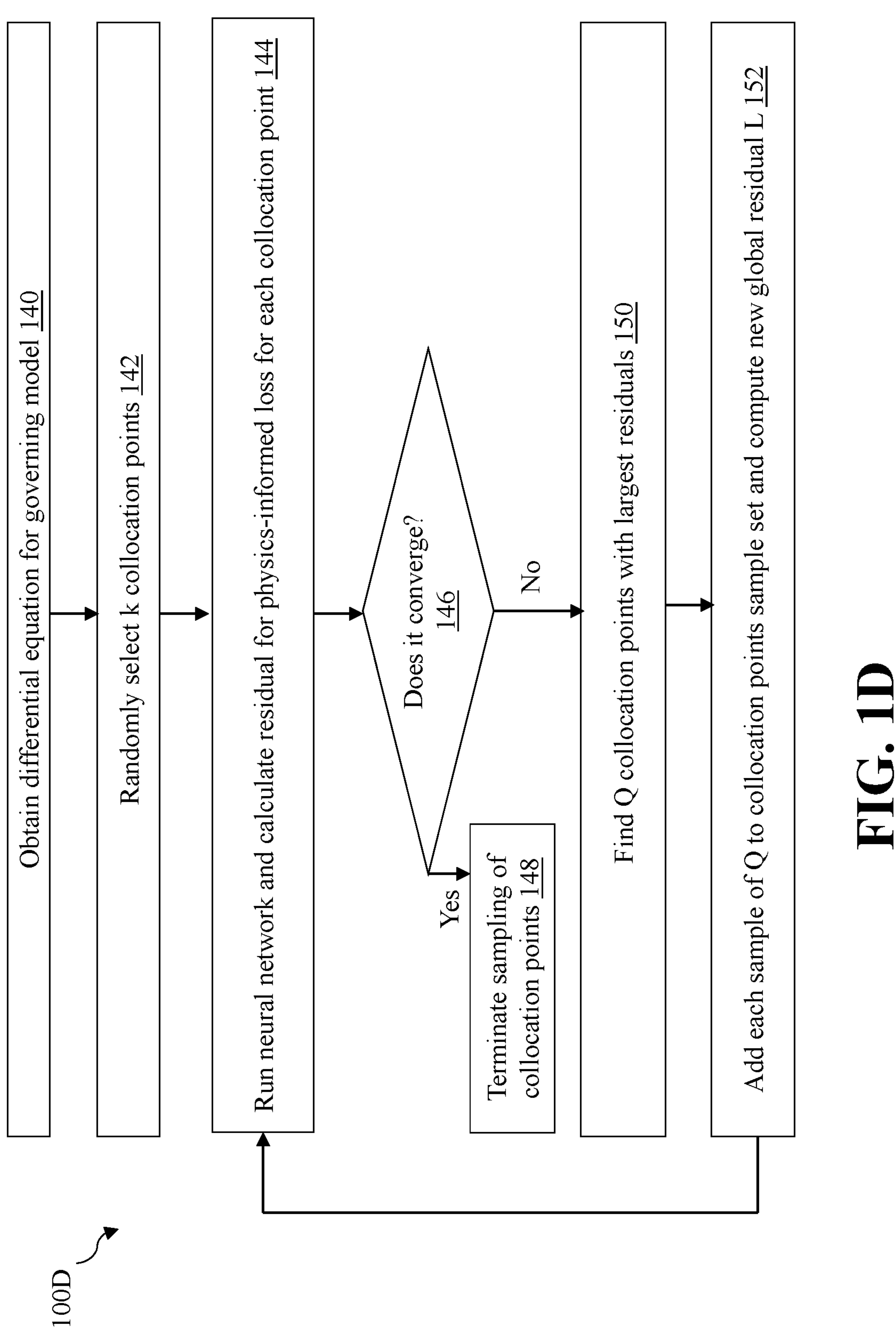
FIG. 1D illustrates a flow chart for generation of collocation points, according to an embodiment of the present disclosure.

The generation of the collocation points 118 utilized in the training of the neural network 106 is further described in FIG. 1D.

FIG. 1D illustrates a flow chart 100D for generation of the collocation points 118, according to an embodiment of the present disclosure. The flow chart 100D may include steps 140, 142, 144, 146, 148, 150 and 152. Fewer or more steps may be provided. Additionally, one or more steps may be combined or split, without departure from the scope of the disclosure.

Generally, a naive selection of the collocation points 118 (or the samples) may lead to inaccurate latent space dynamics, even for larger dimensions of latent space i.e. when r>n. In some embodiments, greedily selecting the collocation points 118 or the samples allows obtainment of significantly fewer degrees of freedom than a full-order simulation while getting a higher accuracy than naive uniform sampling. Further, in some embodiments related to the hyper-reduction of the model, stochastic sampling may eliminate errors due to uniform sampling. To better control the hyper-reduction error, proposed is a greedy algorithm for selection of the collocation points 118 that may augment the collocation points 118 set to meet a target residual for the system.

At step 140, the method may include obtaining the differential equations 114 for the governing model of the system. Details of obtaining the differential equations 114 are further provided, for example, in FIG. 1A.

At step 142, the method may include randomly selecting the collocation points 118. The selected collocation points 118 are utilized for the physics-informed loss 132. To select the collocation points 118 to be used in the physics-informed loss 132 robustly, a computation speed and accuracy may need to be balanced. In an example, "N" number of samples may be employed, and the computation speed roughly scales linearly with the number of employed samples. To maximize the computation speed, fewest number of samples possible may be selected. Given a target accuracy, the greedy algorithm may select the fewest number of collocation points 118 from the appropriate function space of the full-order PDE solution in order to achieve the target accuracy.

At step 144, the neural network 106 may be run and residual may be calculated for the physics-informed loss 132 for each of the selected collocation points 118. Based on the randomly selected collocation points 118, the neural network 106 may be run. Based on the output of the neural network 106, the residual of the physics-informed loss 132 for each of the selected collocation points 118 may be calculated. In every iteration, the greedy algorithm may add one collocation point to the sample set of N" number of samples and lower an error of latent space dynamics related to the physics-informed loss 132.

At step 146, the method may include checking convergence criteria. For example, the convergence of the error of the latent space dynamics related to the physics-informed loss 132 may need to be checked. The convergence criteria may be defined as an average of individual residuals of the physics-informed loss 132.

At step 148, the method may include terminating sampling of the collocation points 118. For example, the selection of the random collocation points 118 may be terminated when the desirable convergence of the error is achieved. In an example, the sampling of the collocation points 118 may be terminated when the convergence of the error is below a predefined threshold error.

At step 150, the method may include sampling of the collocation points 118. The sampling of the collocation points 118 may continue till the desirable convergence of the error is achieved. For example, the convergence of the error is above a predefined threshold error. In such a case, the greedy algorithm loops over "Q" number of the collocation points 118 with the largest individual residuals of the physics-informed loss 132.

At step 152, the method may include adding each sample of the "Q" collocation points 118 to the samples set. Based on the determination that the desired convergence is not achieved, the "Q" collocation points 118 are continuously added to the samples set. The greedy algorithm repeats until the target accuracy is met. For example, until the target accuracy is met, the loop continues from step 144 till step 152.

It may be noted that, compared to the conventional naive uniform sampling approach, the proposed approach with the greedy algorithm yields significantly more accurate results.

Such sampling may be performed either before or after computation of the trajectories obtained from the CFD simulation or experiments module 112, that are then needed in the calculation of the data-driven loss 130.

Figure 2A:
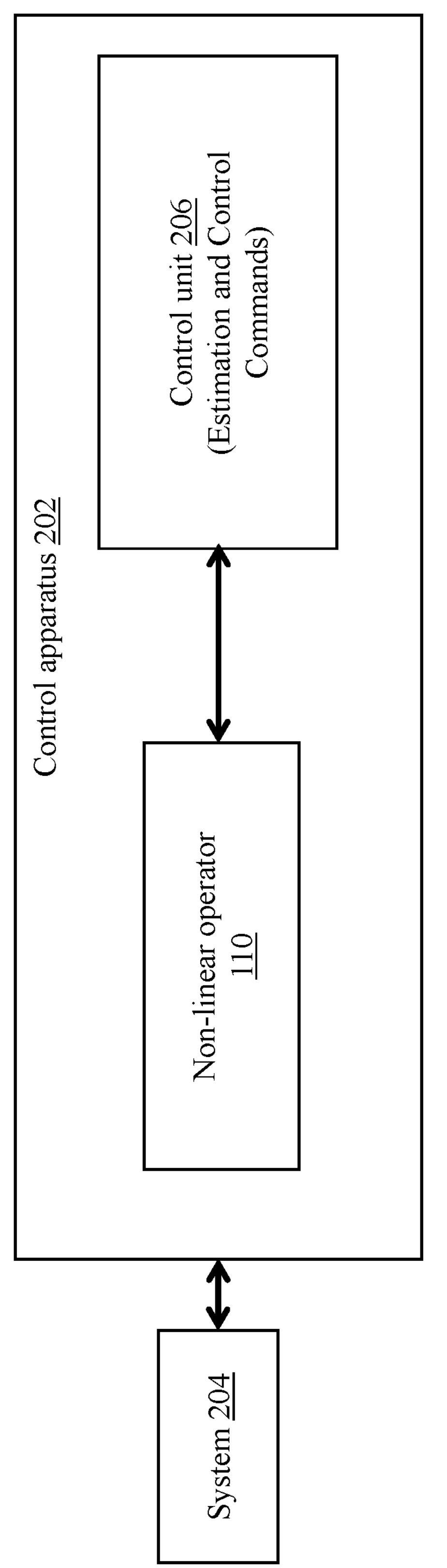
FIG. 2A illustrates a schematic overview of principles used for controlling the operation of the system, according to some embodiments of the present disclosure.

The control of the system based on the output of the neural network 106 is further described in FIG. 2A. FIG. 2A illustrates a schematic overview 200A of principles used for controlling the operation of the system, according to some embodiments of the present disclosure. The schematic overview 200A depicts a control apparatus 202 and a system 204. The system 204 may be the system with the non-linear dynamics. The control apparatus 202 may include the non-linear operator 110 and a control unit 206 in communication with the non-linear operator 110. The control unit 206 is analogous to the control unit 122 of FIG. 1A.

The control apparatus 202 may be configured to control continuously operating dynamical system, such as the system 204 in engineered processes and machines. Hereinafter, 'control apparatus' and 'apparatus' may be used interchangeable and would mean the same. Hereinafter, 'continuously operating dynamical system' and 'system' may be used interchangeably and would mean the same. Examples of the system 204 includes, but may not be limited to, the HVAC systems, light detection and ranging (LIDAR) systems, condensing units, production lines, self-tuning machines, smart grids, car engines, robots, numerically controlled machining, motors, satellites, power generators, and traffic networks. In some embodiments, the control apparatus 202 may be configured to generate estimation and control commands for controlling the operation of the system. For example, the control apparatus 202 may develop control policies, such as the estimation and control commands for controlling the system 204 using control actions in an optimum manner without delay or overshoot in the system 204 and ensuring control stability.

In some embodiments, the generation of the estimation and control commands for controlling the operation of the system may be based on a model-based control and estimation technique. For example, the control unit 206 may be configured to generate the control commands for controlling the system 204 based on at least one of the model-based control and estimation technique or an optimization-based control and estimation technique. For example, the optimization-based control and estimation technique may be a model predictive control (MPC) technique.

The model-based control and estimation technique may be advantageous for control of the dynamic systems, such as the system 204. For example, the MPC technique may allow a model-based design framework in which the dynamics of the system 204 and constraints may directly be considered. The MPC technique may develop the control commands for controlling the system 204, based on the model of the latent space model or the non-linear operator 110. The non-linear operator 110 of the system 204 refers to dynamics of the system 204 described using nonlinear differential equations.

In some embodiments, the control unit 206 may be configured to generate the estimation and control commands for controlling the system 204 based on a data-driven based control and estimation technique. The data-driven based control and estimation technique may exploit operational data generated by the system 204 in order to construct feedback control policy that stabilizes the system 204. For example, each state of the system 204 measured during the operation of the system 204 may be given as the feedback to control the system 204.

In some embodiments, a linear control may be used as approximation using a Jacobian of the NODE, i.e., $$J = \frac{dh}{dz}.$$

Since NODE is a differentiable structure, such a step may be performed using automatic differentiation.

In mathematics and computer algebra, automatic differentiation (AD) or also known as algorithmic differentiation, computational differentiation, auto-differentiation, or simply autodiff, is a set of techniques to evaluate a derivative of a function specified by a computer program. The AD exploits the fact that every computer program, no matter how complicated, executes a sequence of elementary arithmetic operations (addition, subtraction, multiplication, division, etc.) and elementary functions (such as am exponential function, a logarithmic function, a sinusoidal function, a cosine function, etc.). By applying the chain rule repeatedly to such operations, derivatives of arbitrary order may be computed automatically, accurately to working precision, and using at most a small constant factor more arithmetic operations than the original computer program.

Typically, use of the operational data to design the control policies or the control commands is referred as the data-driven based control and estimation technique. The data-driven based control and estimation technique may be utilized to design the control policy from data and the data-driven control policy may further be used to control the system 204. Moreover, in contrast with such data-driven based control and estimation technique, some embodiments may use operational data to design a model, such as the non-linear operator 110. The data-driven model, such as the non-linear operator 110 may be used to control the system 204 using various model-based control methods. Further, the data-driven based control and estimation technique may be utilized to determine actual model of the system 204 from data, i.e., such a model that may be used to estimate behavior of the system 204 that has non-linear dynamics. In an example, the model of the system 204 may be determined from data that may capture dynamics of the system 204 using the differential equations. Furthermore, the model having physics based PDE model accuracy may be learned from the operational data.

Moreover, to simplify the computation of model generation, an ordinary differential equation (ODE) for the non-linear operator 110 may be formulated to describe the dynamics of the system 204. In some embodiments, the parameterized ODEs may be generated based on one or more model reduction techniques. For example, the one or more model reduction techniques may include at least one of a proper orthogonal decomposition (POD)-Galerkin projection method, or a dynamic mode decomposition (DMD) method. Further, the ODE may be a part of the PDE, e.g., describing the boundary conditions. However, in some embodiments, the ODE may be unable to reproduce actual dynamics (i.e. the dynamics described by the PDE) of the system 204, in cases of uncertainty conditions. Examples of the uncertainty conditions may be a case where boundary conditions of the PDE may be changing over a time or a case where one of coefficients involved in the PDE may be changing.

Figure 2B:
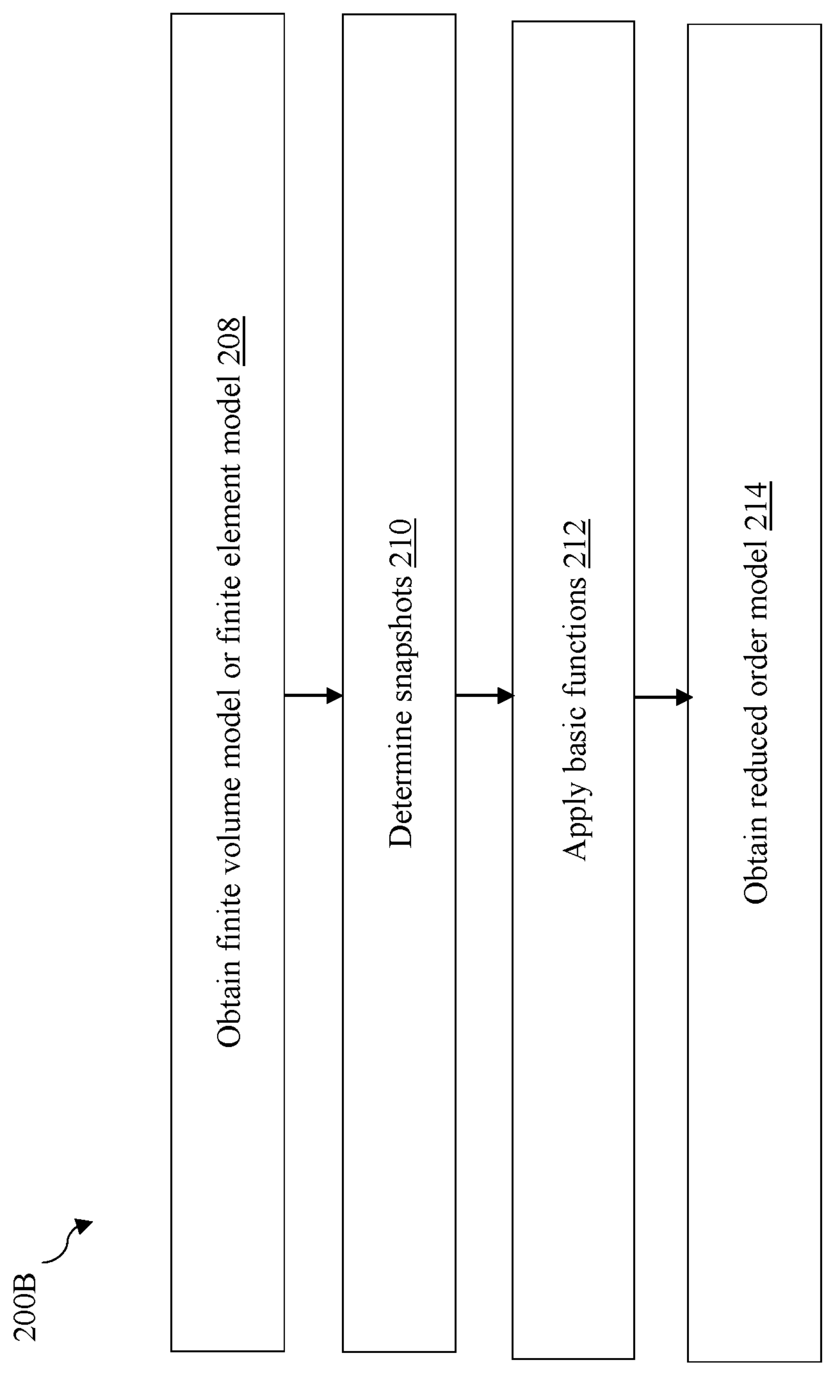
FIG. 2B illustrates a flow chart that depicts an exemplar method to approximate the non-linear operator, according to some embodiments of the present disclosure.

An exemplary method to approximate the non-linear operator 110 is further described in FIG. 2B.

FIG. 2B illustrates a flow chart 200B that depicts an exemplar method to approximate the non-linear operator 110, according to some embodiments of the present disclosure. The flow chart 200B may include steps 208, 210, 212 and 214. Fewer or more steps may be provided. Additionally, one or more steps may be combined or split, without departure from the scope of the disclosure. The flow chart 200B shows an example of the data-driven ROM using POD and Galerkin projection. In such a case, the POD ROM derivation requires snapshots, that may be state parameters value over a period of time. Further, finite volume or finite element methods may be used to solve the original PDE or large-scale systems to find the snapshots. The basis functions may be described as singular value decomposition (SVD) of snapshot matrix.

At step 208, the finite volume model or a finite element model may be obtained. The "finite volume" may refer to a small volume surrounding each node point on a mesh. The finite volume method (FVM) is a method for representing and evaluating the PDEs in the form of algebraic equations. Moreover, the finite element method (FEM) may be used for numerically solving the differential equations arising in engineering and mathematical modeling.

At step 210, the snapshots may be determined based on the finite volume model or the finite element model. In the finite volume method, volume integrals in a partial differential equation that may contain a divergence term are converted to surface integrals, using the divergence theorem. These terms are then evaluated as fluxes at surfaces of each finite volume. As the flux entering a given volume is identical to that leaving the adjacent volume, such methods may be conservative. Another advantage of the FVM is that it is easily formulated to allow for unstructured meshes. Such method is used in many computational fluid dynamics packages.

Moreover, the typical problem areas of interest include the traditional fields of structural analysis, heat transfer, fluid flow, mass transport, and electromagnetic potential. The FEM is a general numerical method for solving partial differential equations in two or three space variables (i.e., some boundary value problems). To solve a problem, the FEM subdivides a large system into smaller, simpler parts that are called finite elements. Such finite elements may be achieved by a particular space discretization in the space dimensions, that is implemented by a construction of a mesh of the object, i.e., a numerical domain for the solution, that has a finite number of points. The finite element method formulation of a boundary value problem finally results in a system of algebraic equations. The method approximates the unknown function over the domain. The simple equations that model these finite elements are then assembled into a larger system of equations that models the entire problem. The FEM then approximates a solution by minimizing an associated error function via the calculus of variations.

At step 212, basis functions may be applied to the snapshots. In linear algebra, the SVD is a factorization of a real or complex matrix. It generalizes the eigen decomposition of a square normal matrix with an orthonormal eigen basis to any matrix. Specifically, the SVD of an m×n complex matrix M is a factorization of the form $M=U\Sigma V^*$ where U is an m×m complex unitary matrix, Σ is an m×n rectangular diagonal matrix with non-negative real numbers on the diagonal, V is an n×n complex unitary matrix, and $V^*$ is the conjugate transpose of V. Such decomposition always exists for any complex matrix. If M is real, then U and V may be guaranteed to be real orthogonal matrices, in such contexts, the SVD is often denoted.

At step 214, the reduced-order model may be obtained. For example, the non-linear operator 110 may be approximated to obtain the reduced-order model. In case the governing equation of the field is known, the Galerkin method may be used to derive a system of ordinary differential equations for the evolution of the time-dependent amplitudes. The tools of Proper Orthogonal Decomposition (POD) and Galerkin projection provide a systematic way for producing reduced-order models from data. The central idea of POD is to determine a nested family of subspaces, of increasing (finite) dimension, that optimally span the data, in the sense that the error in the projection onto each subspace is minimized. The Galerkin projection then determines dynamics on each subspace, by orthogonal projection of the governing equations.

Some embodiments of the present disclosure are based on recognition that dominant structures and their time evolution may be determined by various feature extraction techniques, such as the POD or dynamic mode decomposition (DMD). For example, in an embodiment, a reduced order model (ROM) has a quadratic form:

$$\dot{x}_r = Ax_r + x_r^T Bx_r + b \tag{9}$$

where b, A, B are constants related to the constants of the PDE equation and to the type of model reduction algorithm used, and $x_r$ is of a reduced dimension r and represents the vector of the reduced order states. The original states of the system x may be recovered from $x_r$ using the following simple algebraic equation:

$$x(t) = Ux_r(t) \tag{10}$$

where x is usually a vector of high dimension n>>r, containing a room airflow and a room temperature at "n" desired points or locations of the room, obtained from the spatial discretization of the PDE equation. Further, U is a matrix formed by concatenating given vectors called modes or basis vectors of the ROM. Such modes differ depending on which model reduction method is used. For example, the POD may be used or the DMD method may be used.

However, the solution of the ROM may lead to unstable solution (such as the solution may be divergent over a finite time support) that is not reproducing the physics of the original PDE models having a viscous term that makes the solutions always stable, i.e. bounded over a bounded time support. Furthermore, the POD based model reduction methods restrict the state to evolve in a linear subspace (linear trial sub-spaces), that imposes a fundamental limitation on an efficiency and accuracy of the resulting ROM. Such linear trial sub-spaces also exist in other model reduction methods, such as balanced truncation, rational interpolation and reduced-basis method. To address such limitations, some embodiments of the present disclosure propose data driven non-intrusive model reduction framework using autoencoder network methods to tackle the linear trial sub-spaces issue. Such deep learning based models project original high-dimensional dynamical systems into a nonlinear subspace and predict the nonlinear dynamics.

Figure 2C:
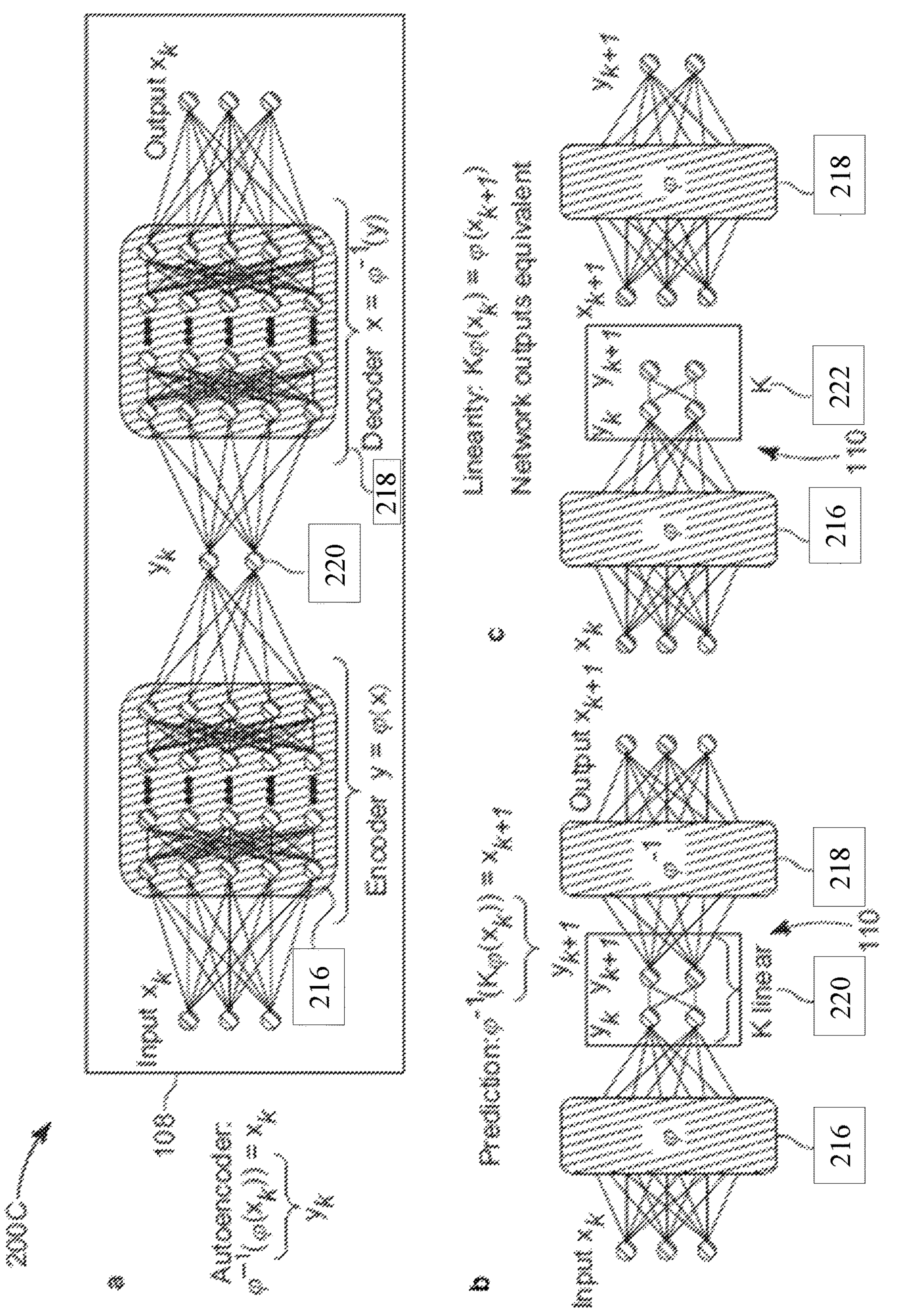
FIG. 2C illustrates a schematic diagram of an autoencoder architecture of the neural network, according to some embodiments of the present disclosure.

An example of the usage of the deep learning technique (or the neural network model 106) to approximate the non-linear operator 110 for model reduction is further provided in FIG. 2C.

FIG. 2C illustrates a schematic diagram 200C of the autoencoder architecture of the neural network, according to some embodiments of the present disclosure. For example, a deep neural network model may be utilized to learn nonlinear basis and the non-linear operator 110 using data of the snapshots. The schematic diagram 200C includes the autoencoder 108. The autoencoder 108 includes an encoder 216, a decoder 218 and a non-linear operator 220. The non-linear operator 220 may be same as the non-linear operator 110 of FIG. 1A. The schematic diagram 200C further includes a non-linear operator 220 and a non-linear operator 222.

The autoencoder 108 may be a special type of neural network model suitable for the HVAC applications. The encoder 216 may be represented as "$\Psi$". The decoder 218 may be represented as "$\Psi^{-1}$". The decoder 218 may seek an inverse transformation to reconstruct the original measurements of the dynamics of the system 204.

Moreover, within the latent space of the autoencoder 108, such as the non-linear operator 220, the dynamics of the system 204 is constrained to be represented by NODE.

Typically, the autoencoder 108 may be trained in a number of ways. Normally, the training dataset X is arranged as a three-dimensional (3D) tensor, with its dimensions to be number of sequences (with different initial states), number of snapshots, and dimensionality of the measurements, respectively.

Figure 3:
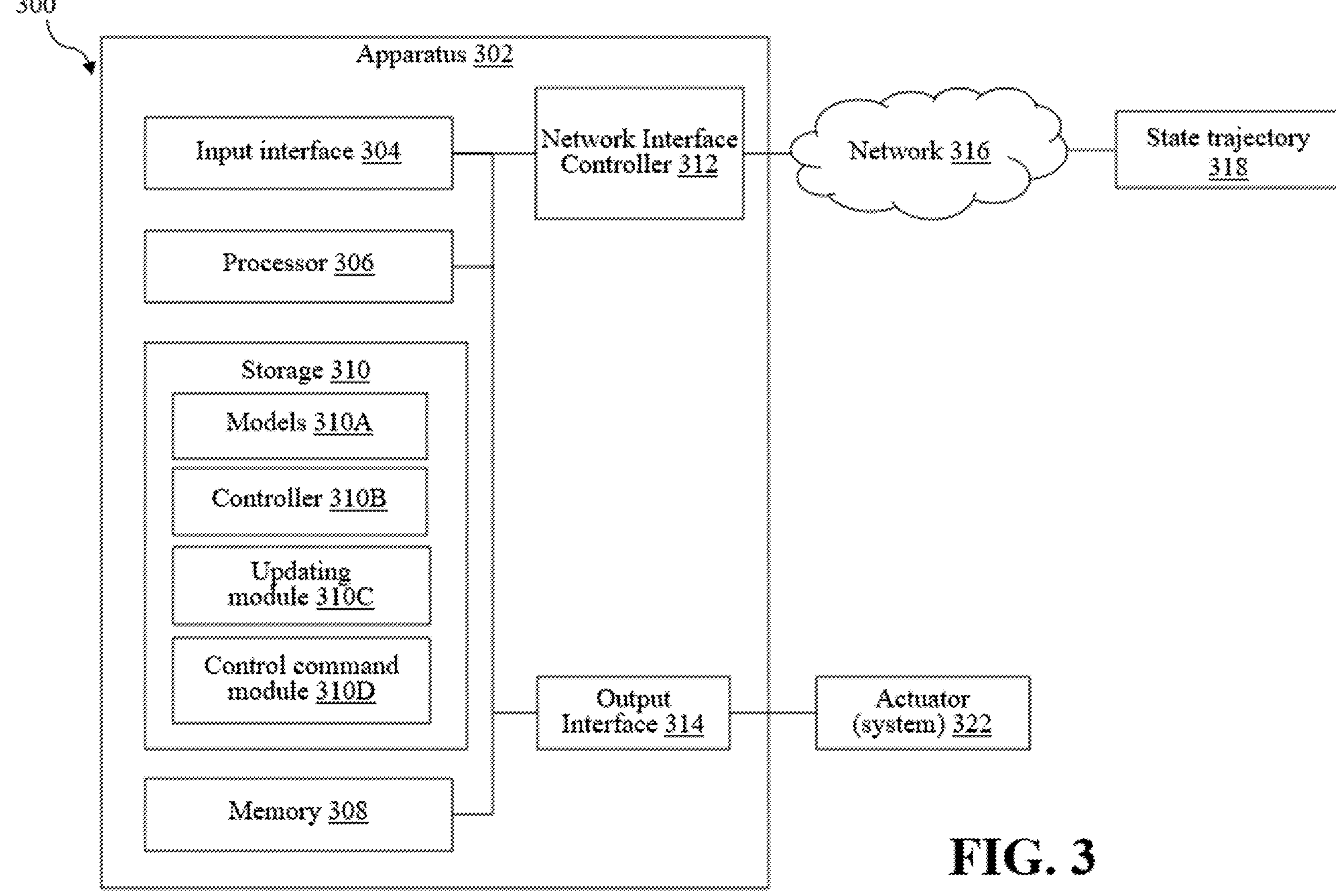
FIG. 3 illustrates a block diagram of an apparatus for controlling the operation of the system, according to some embodiments of the present disclosure.

The block diagram of an apparatus to control the operation of the system 204 is further described in FIG. 3.

FIG. 3 illustrates a block diagram 300 of an apparatus 302 for controlling the operation of the system 204, according to some embodiments of the present disclosure. The block diagram 300 may include the apparatus 302. The apparatus 302 may include an input interface 304, a processor 306, a memory 308 and a storage 310. The storage 310 may further include models 310*a*, a controller 310*b*, an updating module 310*c* and a control command module 310*d*. The apparatus 302 may further include a network interface controller 312 and an output interface 314. The block diagram 300 may further include a network 316, a state trajectory 318 and an actuator 320 associated with the system 204.

The apparatus 302 includes the input interface 304 and the output interface 314 for connecting the apparatus 302 with other systems and devices. In some embodiments, the apparatus 302 may include a plurality of input interfaces and a plurality of output interfaces. The input interface 304 is configured to receive the state trajectory 318 of the system 204. The input interface 304 includes the network interface controller (NIC) 312 adapted to connect the apparatus 302 through a bus to the network 316. Moreover, through the network 316, either wirelessly or through wires, the apparatus 302 receives the state trajectory 318 of the system 204.

The state trajectory 318 may be a plurality of states of the system 204 that defines an actual behavior of dynamics of the system 204. For example, the state trajectory 318 may act as a reference continuous state space for controlling the system 204. In some embodiments, the state trajectory 318 may be received from real-time measurements of parts of the system 204 states. In some other embodiments, the state trajectory 318 may be simulated using the PDE that describes the dynamics of the system 204. In some embodiments, a shape may be determined for the received state trajectory 318 as a function of time. The shape of the state trajectory 318 may represent an actual pattern of behavior of the system 204.

The apparatus 302 further includes the memory 308 for storing instructions that are executable by the processor 306. The processor 306 may be a single core processor, a multi-core processor, a computing cluster, or any number of other configurations. The memory 308 may include random access memory (RAM), read only memory (ROM), flash memory, or any other suitable memory system. The processor 306 is connected through the bus to one or more input and output devices. Further, the stored instructions implement a method for controlling the operations of the system 204. The memory 308 may be further extended to include storage 310. The storage 310 may be configured to store 310 models 310*a*, the controller 310*b*, the updating module 310*c*, and the control command module 310*d*.

The controller 310*b* may be configured to store instructions upon execution by the processor 306 that executes one or more modules in the storage 310. Moreover, the controller 310*b* administrates each module of the storage 310 to control the system 204.

Further, in some embodiments, the updating module 310*c* may be configured to update a gain associated with the model of the system 204. The gain may be determined by reducing an error between the state of the system 204 estimated with the models 310*a* and an actual state of the system 204. In some embodiments, the actual state of the system 204 may be a measured state. In some other embodiments, the actual state of the system 204 may be a state estimated with the PDE describing the dynamics of the system 204. In some embodiments, the updating module 310*c* may update the gain using an extremum seeking. In some other embodiments, the updating module 310*c* may update the gain using a Gaussian process-based optimization technique.

The control command module 310*d* may be configured to determine a control command based on the models 310*a*. The control command module 310*d* may control the operation of the system 204. In some embodiments, the operation of the system 204 may be subject to constraints. Moreover, the control command module 310*d* uses a predictive model-based control technique to determine the control command while enforcing constraints. The constraints include state constraints in continuous state space of the system 204 and control input constraints in continuous control input space of the system 204.

The output interface 314 is configured to transmit the control command to the actuator(s) 322 of the system 204 to control the operation of the system 204. Some examples of the output interface 314 may include a control interface that submits the control command to control the system 204.

Figure 4:
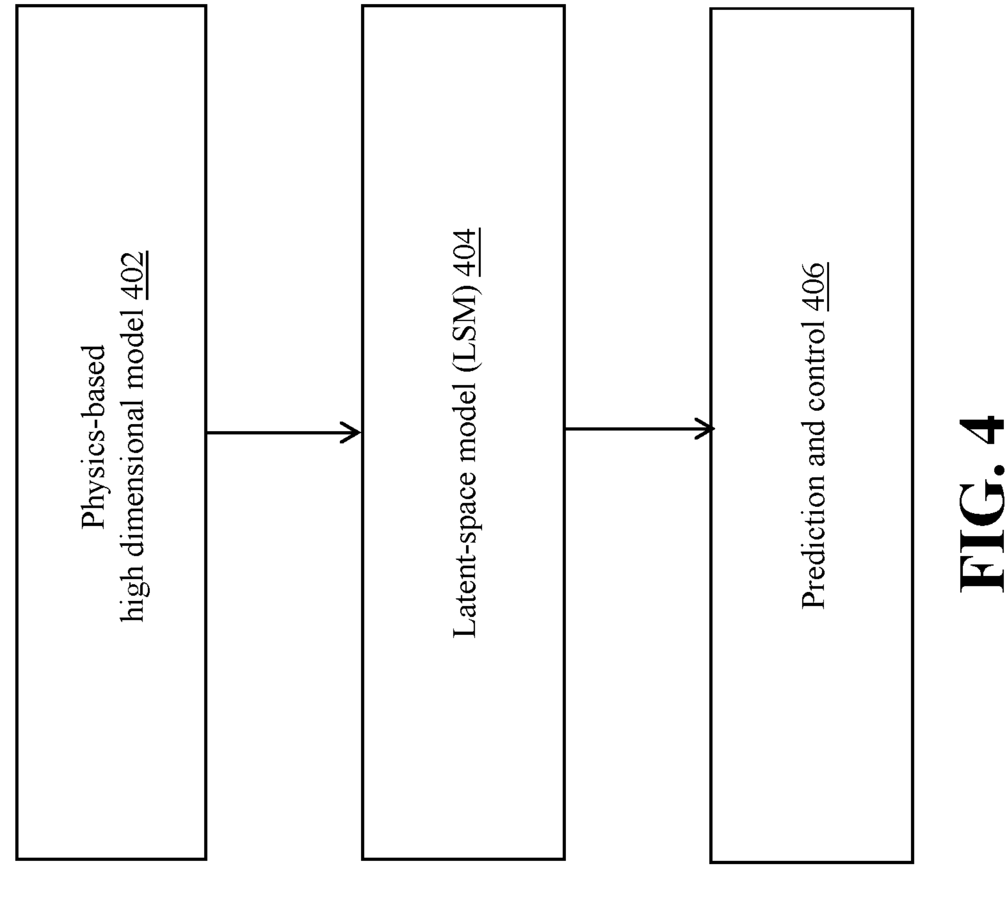
FIG. 4 illustrates a flowchart of principles for controlling the operation of the system, according to some embodiments of the present disclosure.

The control of the system 204 is further explained in FIG. 4.

FIG. 4 illustrates a flowchart 400 of principles for controlling the operation of the system 204, according to some embodiments of the present disclosure. The flowchart 400 may include steps 402, 404 and 406.

In some embodiments, the system 204 may be modeled from physics laws. For instance, the dynamics of the system 204 may be represented by mathematical equations using the physics laws.

At step 402, the system 204 may be represented by a physics-based high dimension model. The physics-based high dimension model may be the partial differential equation (PDE) describing the dynamics of the system 204. In an example, the system 204 is considered to be the HVAC system, whose model is represented by Boussinesq equation. The Boussinesq equation may be obtained from the physics, which describes a coupling between airflow and the temperature in the room. Accordingly, the HVAC system model may be mathematically represented as:

a.

$$\vec{u}_t = \mu\Delta\vec{u} - (\vec{u}\cdot\nabla)\vec{u} - \nabla p - g\beta\Delta T \quad (11a)$$

b.

$$\nabla\cdot\vec{u} = 0 \quad (11b)$$

c.

$$T_t = k\Delta T - u\cdot\nabla T \quad (11c)$$

where T is a temperature scalar variable, $\vec{u}$ is a velocity vector in three dimensions, μ is a viscosity and the reciprocal of the Reynolds number, k is a heat diffusion coefficient, p is a pressure scalar variable, g is gravity acceleration, and β is the expansion coefficient. The set of equations, such as equation 11a, equation 11b and equation 11c are referred to as Navier-Stokes equation plus conservation of energy. In some embodiments, such combination is known as Boussinesq equation. Such equations are valid for cases where the variation of temperature or density of air compared to absolute values of a reference point, e.g., temperature or density of air at the corner of the room, are negligible. Similar equations may be derived when such assumption is not valid, thus compressible flow model needs to be derived. Moreover, the set of equations are subjected to appropriate boundary conditions. For example, the velocity or temperature of the HVAC unit may be considered as boundary condition.

The operator Δ and ∇ may be defined in 3-dimensional room as:

$$\Delta = \nabla^2 \quad (12)$$

$$\nabla = \left(\frac{\delta}{\delta x}, \frac{\delta}{\delta y}, \frac{\delta}{\delta z}\right)T \quad (13)$$

Some embodiments, refers to the governing equations in more abstract from of as follows:

$$z_{k+1} = f(z_k), \quad (14)$$

$$y_k = Cz_k, \quad (15)$$

where $z_k \in \mathbb{R}^n$ and $y_k \in \mathbb{R}^p$ are respectively the state and measurement at time k, f: $\mathbb{R}^n \rightarrow \mathbb{R}^n$ is a time-invariant nonlinear map from current to next state, and $C \in \mathbb{R}^{p\times n}$ is a linear map from state to measurement.

In some embodiments such abstract dynamics may be obtained from a numerical discretization of a nonlinear partial differential equation (PDE), that typically requires a large number n of state dimensions.

In some embodiments, the physics-based high dimension model of the system 204 needs to be resolved to control the operations of the system 204 in real-time. For example, in the case of the HVAC system, the Boussinesq equation needs to be resolved to control the airflow dynamics and the temperature in the room. In some embodiments, the physics-based high dimension model of the system 204 comprises a large number of equations and variables, which may be complicated to resolve. For instance, a larger computation power is required to resolve the physics-based high dimension model in real-time. Thus, the physics-based high dimension model of the system 204 may be simplified.

At step 404, the apparatus 302 is provided to generate the reduced order model to reproduce the dynamics of the system 204, such that the apparatus 302 controls the system 204 in efficient manner. In some embodiments, the apparatus 302 may simplify the physics-based high dimension model using model reduction techniques to generate the reduced order model. In some embodiments, the model reduction techniques reduce the dimensionality of the physics-based high dimension model (for instance, the variables of the PDE), such that the reduced order model may be used to in real-time for prediction and control of the system 204. Further, the generation of reduced order model for controlling the system 204 is explained in detail with reference to FIG. 5. At step 406, the apparatus 302 uses the reduced order model in real-time to predict and control the system 204.

Figure 5:
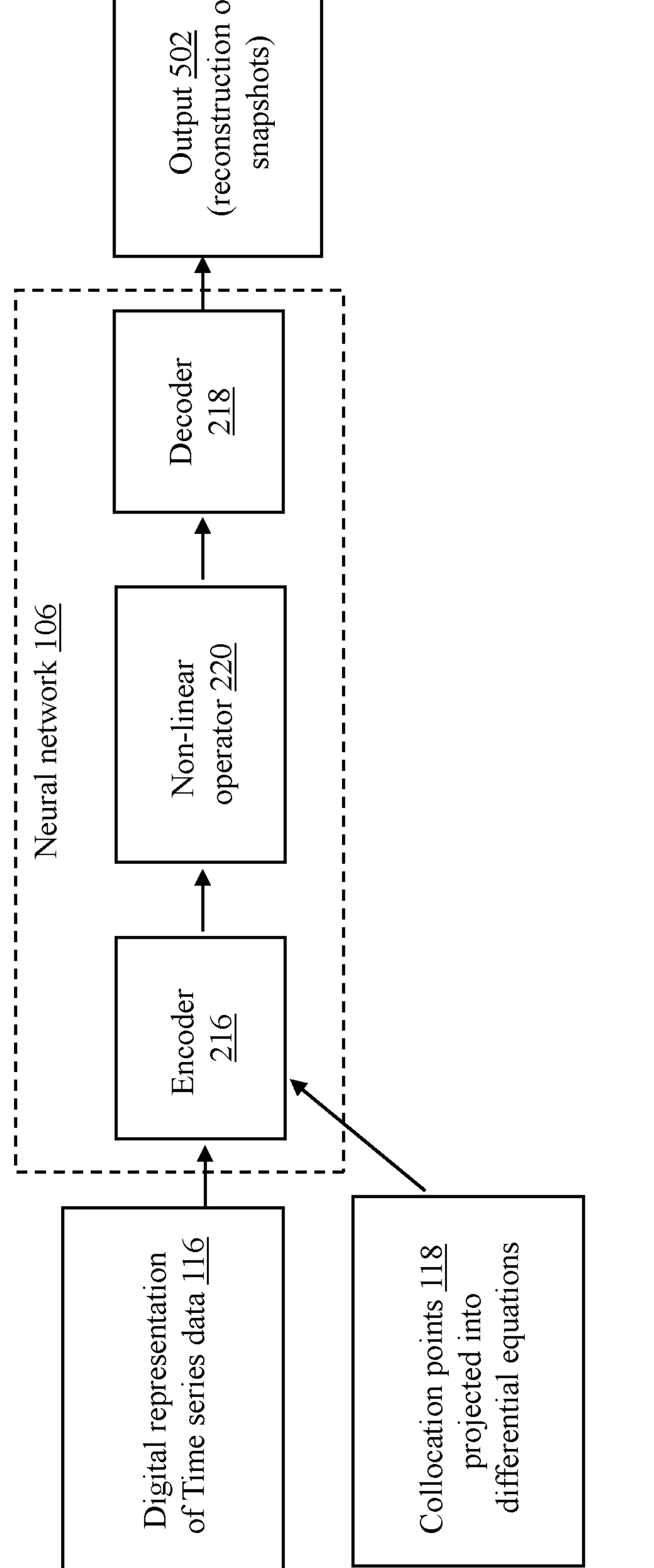
FIG. 5 illustrates a block diagram that depicts generation of a reduced order model, according to some embodiments of the present disclosure.

The generation of the reduced order model, such as the non-linear operator 110 is further described in FIG. 5.

FIG. 5 illustrates a block diagram 500 that depicts generation of the reduced order model, according to some embodiments of the present disclosure. The non-linear operator 110 is the reduced order model. The block diagram 500 depicts an architecture that includes the digital representation of the time series data 116, and the neural network 106. The autoencoder 108 of the neural network 106 includes the encoder 216, the decoder 218 and the non-linear operator 220. The block diagram 500 further depicts an output 502 of the neural network 106.

Figure 6:
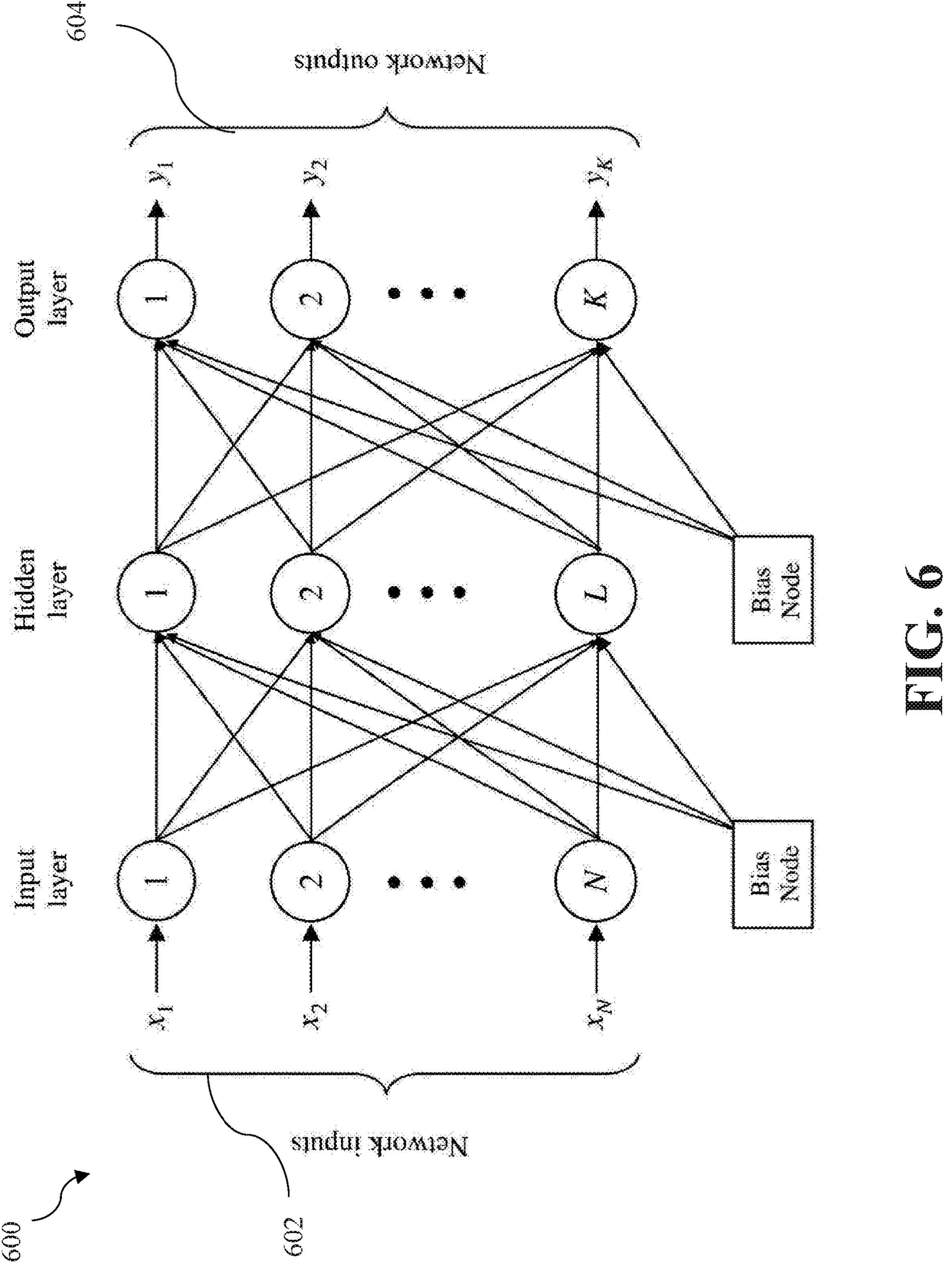
FIG. 6 illustrates a schematic diagram of the neural network, according to some embodiments of the present disclosure.

The snapshots of the CFD simulation or experiments are the data needed for the autoencoders, such as the autoencoder 108, which are neural network models as described in FIG. 6. The latent space is governed by the non-linear ODE, that is to be learned based on both the snapshots of the data and model information using the DSC equation, such as equation 14.

Moreover, for a given time-dependent differential equation (for example, ODE or PDE), there may be a set of feasible initial conditions. Some embodiments define the feasible initial conditions as the ones that may fall into the domain of the system dynamics f.

Typically, the domain of a function is a set of inputs accepted by the function. More precisely, given a function f: X→Y, the domain of f is X. The domain may be a part of the definition of a function rather than a property of it. In such a case X and Y are both subsets of R, and the function f may be graphed in a Cartesian coordinate system. In such a case, the domain is represented on an x-axis of the graph, as the projection of the graph of the function onto the x-axis.

In some embodiments, the generation of the collocation points 118 is based on a subset of the set of initial and boundary conditions with a structure reducing a complexity of solving the PDE, and a functional space of the system satisfying the subset of the initial and boundary conditions. The collocation points 118 may be samples extracted from the domain of the system dynamics f, such that in case of the PDEs, the collocation points 118 may satisfy the initial and boundary conditions.

In some embodiments, the subset of the initial and boundary conditions may include at least one of sinusoidal functions, harmonic functions, periodic functions, or exponential functions. For example, if the boundary conditions of the system dynamics f are periodic, the collocation points 118 should be periodic. If the boundary conditions are Dirichlet, i.e. the system dynamics f equals to certain values at its boundary points, the collocation point 118 should also be equal to such values at the corresponding boundary points. Advantageously, the collocation points 118 may be much computationally cheaper to be evaluated compared to the computation of the snapshots. The snapshots may be generated either by a simulator or experiments, while the collocation points 118 may be generated simply by sampling them from a feasible function space.

Moreover, the function space is a set of functions between two fixed sets. Often, the domain and/or codomain may have additional that may be inherited by the function space. For example, the set of functions from any set X into a vector space has a natural vector space structure given by pointwise addition and scalar multiplication. In other scenarios, the function space might inherit a topological or metric structure.

The autoencoder 108 may receive the digital representation of the time series data 116 and the collocation points 118 projected into the differential equations. The encoder 216 encode the digital representation into the latent space. The non-linear predictor 220 may propagate the encoded digital representation into the latent space with the transformation determined by values of parameters of the non-linear operator 220. Furthermore, the decoder 218 may the decode the transformed encoded digital representation. The output 502 of the transformed encoded digital representation may be the reconstructed snapshots or the decoded linearly transformed encoded digital representation.

A basic neural network implemented for the architecture of the autoencoder 108 is described in FIG. 6.

FIG. 6 illustrates a schematic diagram 600 of the neural network 106, according to some embodiments of the present disclosure. The neural network 106 may be a network or circuit of an artificial neural network, composed of artificial neurons or nodes. Thus, the neural network 106 is an artificial neural network used for solving artificial intelligence (AI) problems. The connections of biological neurons are modeled in the artificial neural networks as weights between nodes. A positive weight reflects an excitatory connection, while a negative weight values mean inhibitory connections. All inputs 602 of the neural network 106 may be modified by a weight and summed. Such an activity is referred to as a linear combination. Finally, an activation function controls an amplitude of an output 604 of the neural network 106. For example, an acceptable range of the output 604 is usually between 0 and 1, or it could be −1 and 1. The artificial networks may be used for predictive modeling, adaptive control and applications where they may be trained via a training dataset. Self-learning resulting from experience may occur within networks, which may derive conclusions from a complex and seemingly unrelated set of information. The architecture of the blocks of the autoencoder 106 are described in FIGS. 7A, 7B and 7C.

Figure 7A:
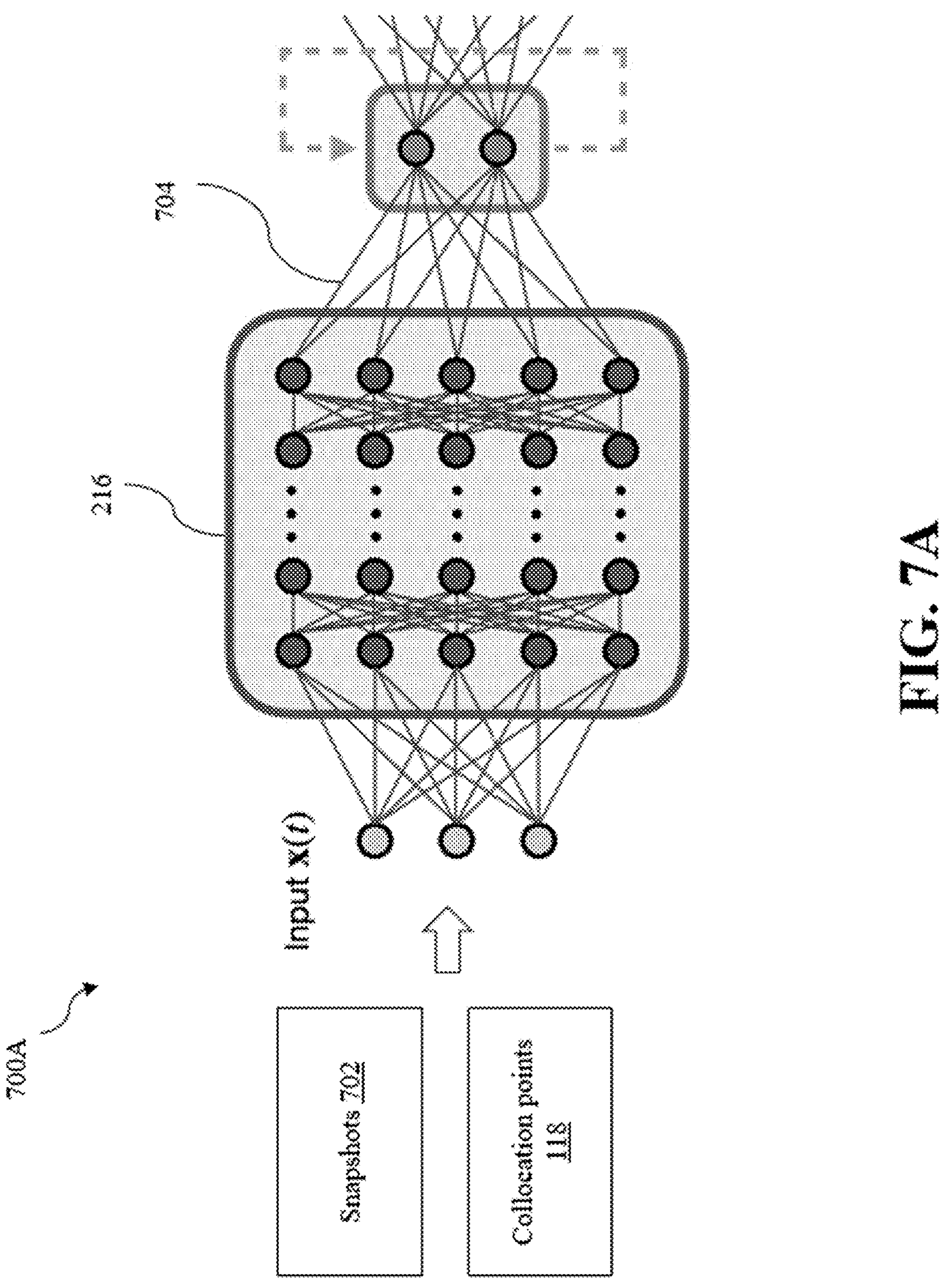
FIG. 7A illustrates a diagram that depicts input of the digital representation in an encoder of the neural network model, according to some embodiments of the present disclosure.

FIG. 7A illustrates a diagram 700A that depicts input of the digital representation in the encoder 216 of the neural network 106 (such as the autoencoder 108), according to some embodiments of the present disclosure. The diagram 700A includes the encoder 216, snapshots 702, the collocation points 118, and a last layer 704 of the encoder 216.

The input of the encoder 216 may be either the snapshots 702 or the collocation points 118. The snapshots 702 may be for example the digital representation of time series data 116. The encoder 216 takes values of the snapshots 702 or the collocation points 118. The encoder 216 outputs to the latent space or the non-linear operator 220 through the last layer 704 of the encoder 216. The digital representation of time series data 116 indicative of the measurements of the operation of the system 204 at different instances of time may be collected. Further, for training of the neural network 106 (such as the autoencoder 108) having the autoencoder architecture, the encoder 216 may encode the digital representation into the latent space. The process of encoding is the model reduction.

Figure 7B:
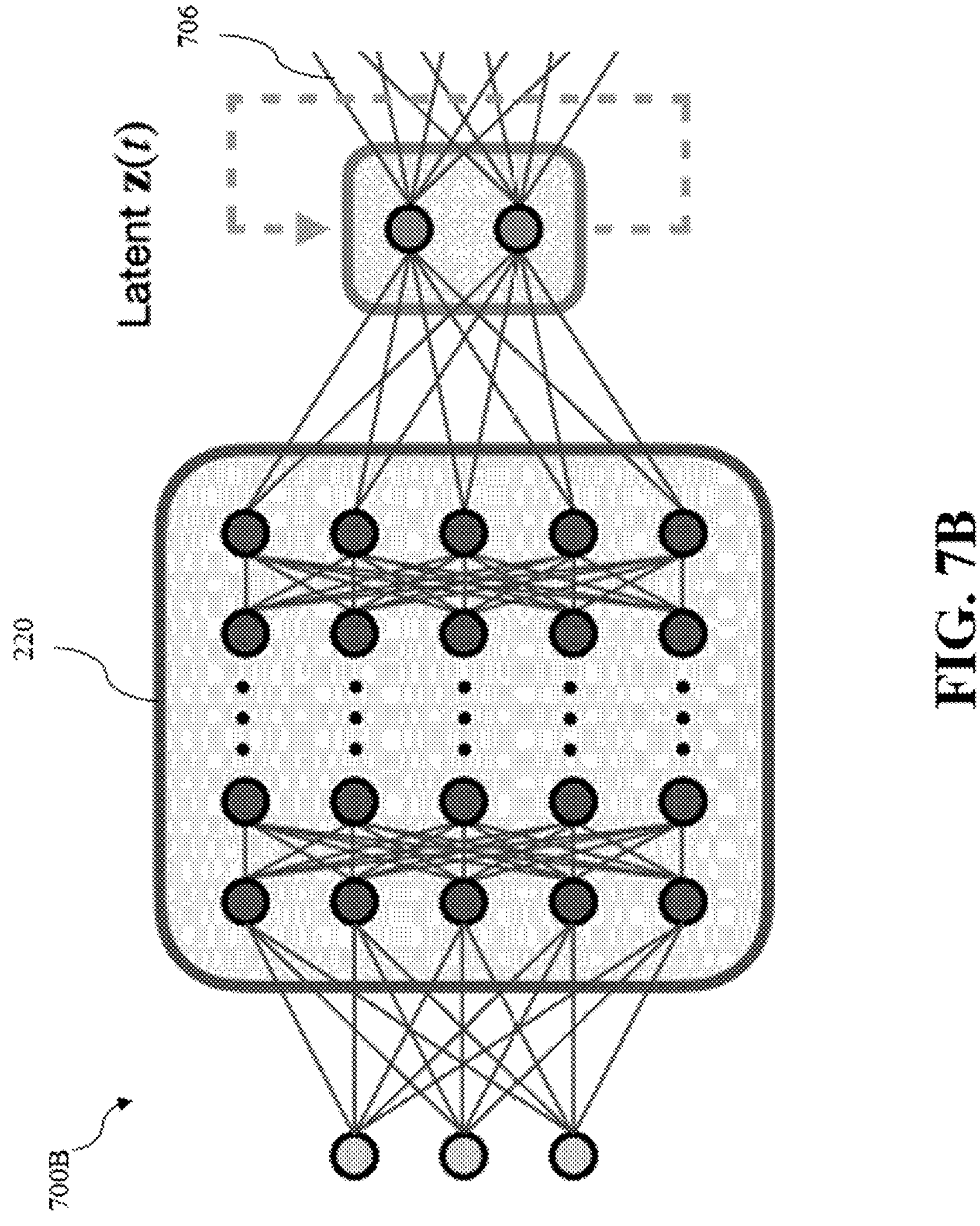
FIG. 7B illustrates a diagram that depicts propagation of the encoded digital representation into a latent space by the non-linear operator of the neural network model, according to some embodiments of the present disclosure.

FIG. 7B illustrates a diagram 700B that depicts propagation of the encoded digital representation into the latent space by the non-linear operator 220 of the neural network 106, according to some embodiments of the present disclosure. The diagram 700B includes the last layer 704 of the encoder 220, the-linear operator 220, and a last iteration 706 of the non-linear operator 220 or the latent space model. The non-linear operator 220 is presented as a NODE and denoted by $h_\theta$.

The non-linear operator 220 is configured to propagate the encoded digital representation into the latent space with linear transformation determined by values of parameters of the non-linear operator 220. The output of the last iteration 706 of the non-linear operator 220 is passed to the decoder 218 of the neural network 106. The process of propagating the encoded digital representation into the latent space is referred as reduced order model propagation or time integration.

Figure 7C:
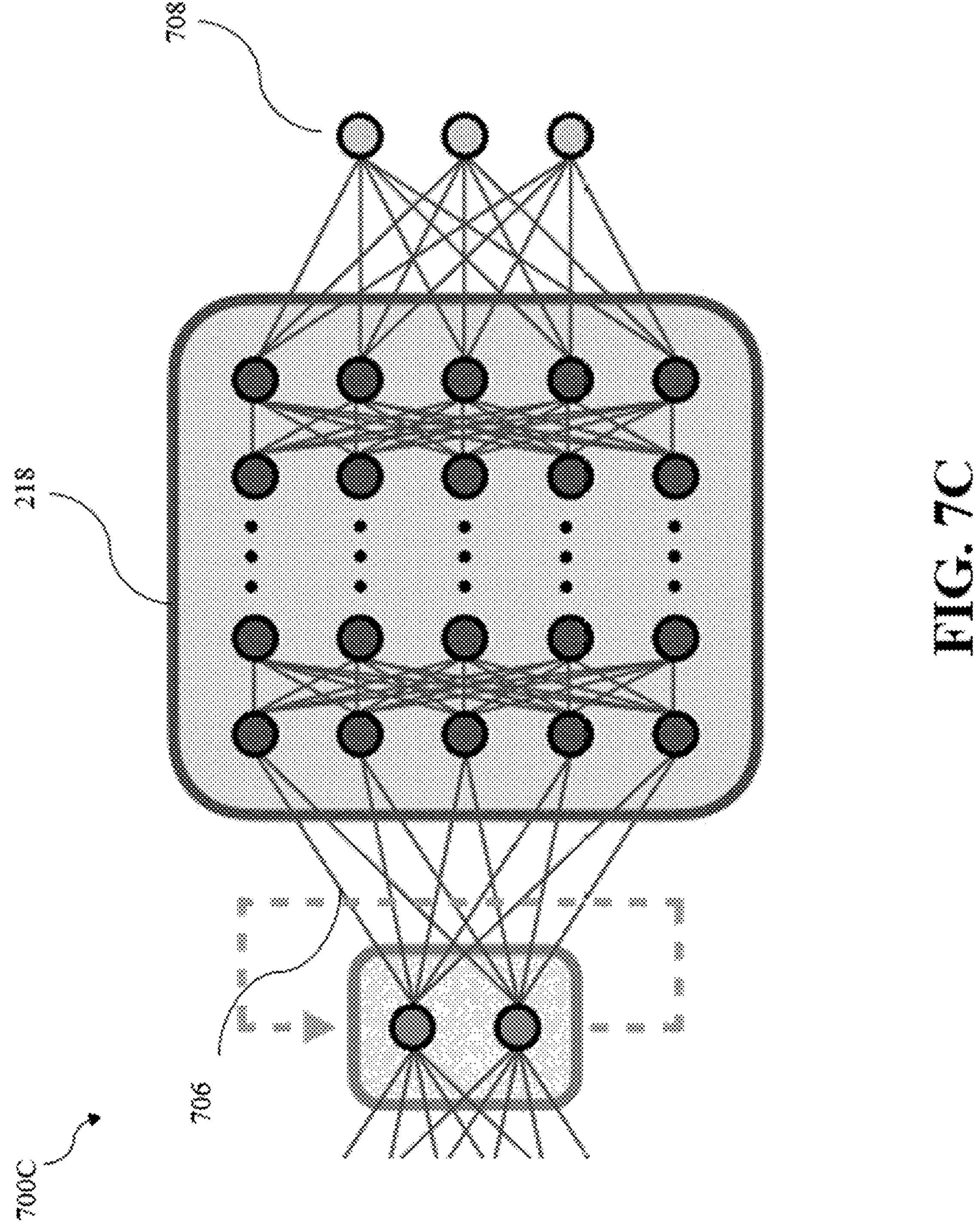
FIG. 7C illustrates a diagram depicting decoding of transformed encoded digital representation by a decoder of the neural network model, according to some embodiments of the present disclosure.

FIG. 7C illustrates a diagram 700C depicting decoding of transformed encoded digital representation by the decoder 218 of the neural network 106, according to some embodiments of the present disclosure. The diagram 700C includes the decoder 218, the last iteration 706 of the non-linear operator 220, and an output 708 of the decoder 218.

The decoder 218 puts forward the input and results in the output 708. The decoder 218 is configured to decode the transformed encoded digital representation to generate the output 708. The output 708 is the decoded linearly transformed encoded digital representation, such as the reconstructed snapshots as described in FIG. 5. The process of the decoding is the reconstruction of the snapshots.

The neural network 106 identifies the appropriate nonlinear coordinate for model reduction. The output of the encoder 216 is $z=\phi(x)$, where x is the input comprising in general as the summation of the snapshots 702 and the collocation points 118. The dynamic within the latent space is nonlinear and the output of the non-linear operator 220 is given by $\dot{z}=h_\theta(z)$, where $h_\theta$ is modeled as a neural ODE whose explicit equation is not a-priori known and instead is determined during the training and/or inference time or auto refining process. Furthermore, an inverse of $x=\psi(z)$. The neural network 106 is trained to minimize the hybrid loss 134 including the data-driven loss 130 between the decodings of the neural network 106 and the collected time series data 116 and the physics-informed loss 132 between the decodings of the neural network 106 and solutions of the PDEs at the collocation points 118.

Figure 8:
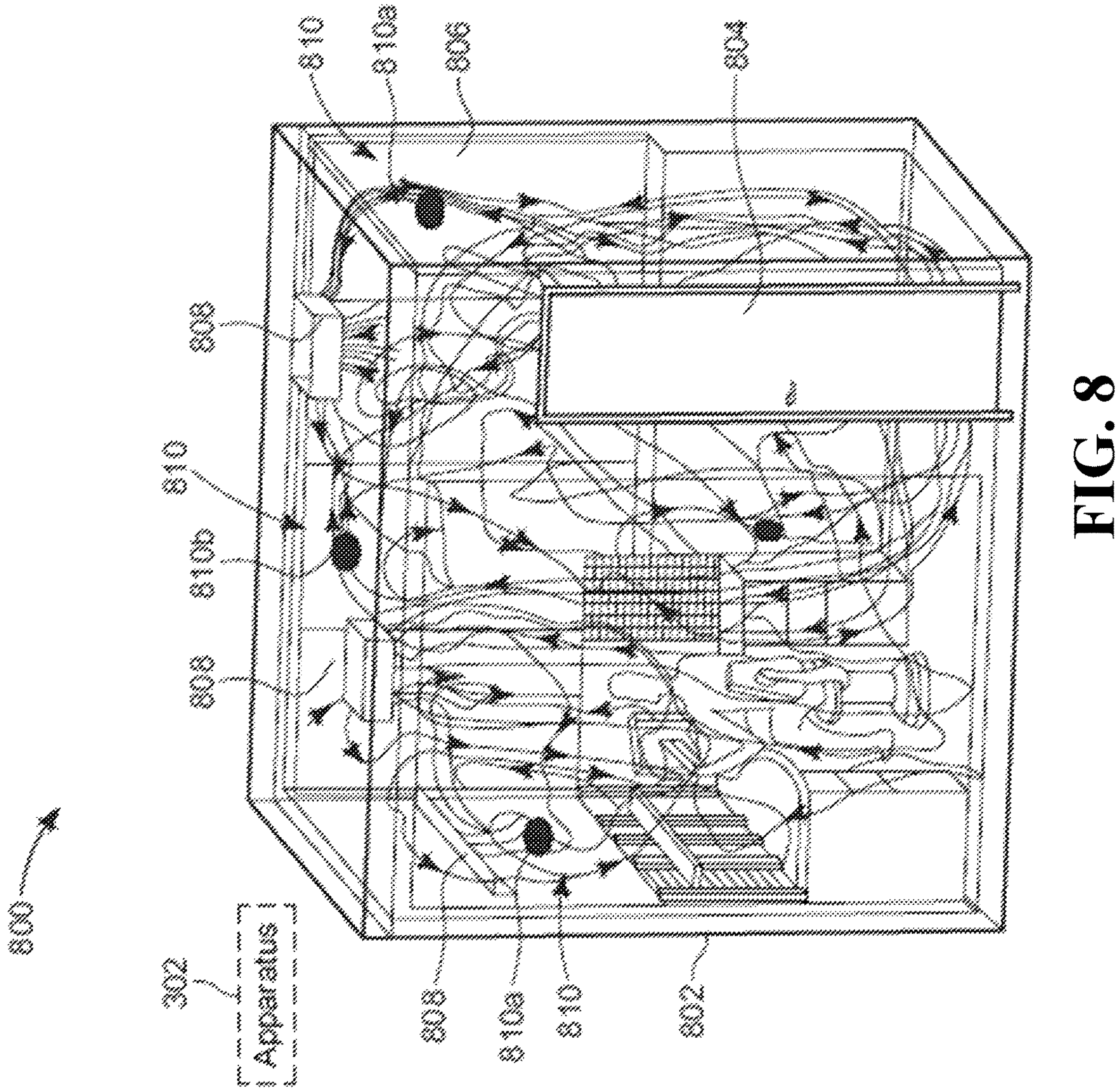
FIG. 8 illustrates an exemplar diagram for real-time implementation of the apparatus for controlling the operation of an air-conditioning system, according to some embodiments of the present disclosure.

An exemplary scenario for real-time implementation of the apparatus 302 for controlling the operation of the system 204 is further described in FIG. 8.

FIG. 8 illustrates an exemplary diagram 800 for real-time implementation of the apparatus 302 for controlling the operation of the system 204, according to some embodiments of the present disclosure. The exemplary diagram 800 includes a room 802, a door 804, a window 806, a ventilation units 808, and a set of sensors 810.

In an exemplary scenario, the system 204 is an air conditioning system. The exemplary diagram 800 shows the room 802 that has the door 804 and at least one window 806. The temperature and the airflow of the room 802 are controlled by the apparatus 302 via the air conditioning system through ventilation units 808. The set of sensors 810 such as a sensor 810*a* and a sensor 810*b* are arranged in the room 802. The at least one airflow sensor, such as the sensor

810*a* is used for measuring velocity of the air flow at a given point in the room 802, and at least one temperature sensor, such as the sensor 810*b* is used for measuring the room temperature. It may be noted that other type of setting may be considered, for example a room with multiple HVAC units, or a house with multiple rooms.

Figure 9:
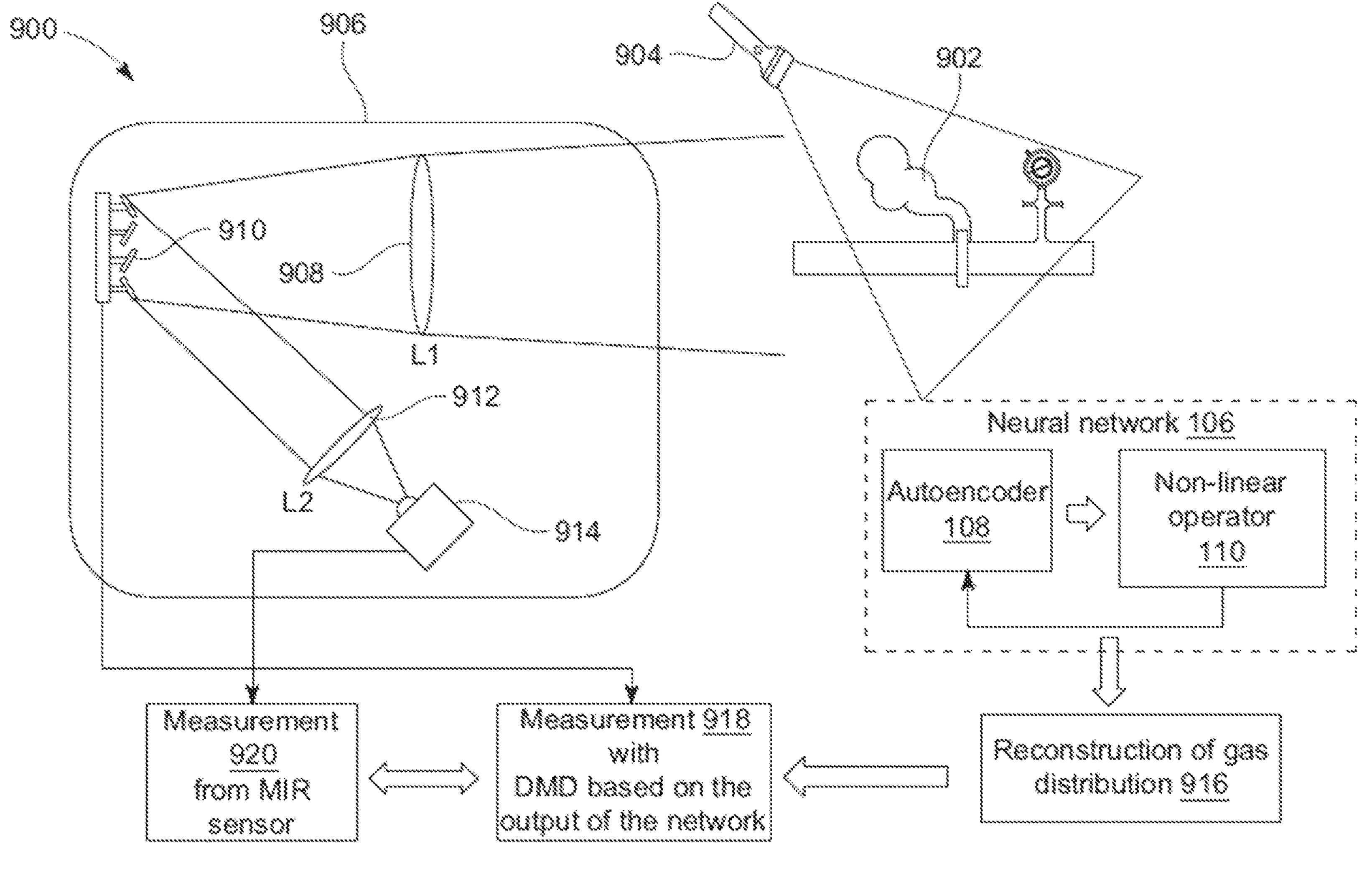
FIG. 9 illustrates an exemplar diagram for real-time implementation of the apparatus for reconstructing a distribution of a gas from a camera, according to some embodiments of the present disclosure.

Another exemplary scenario for real-time implementation of the apparatus 302 for imaging of a greenhouse gas leak is further described in FIG. 9.

FIG. 9 illustrates an exemplary diagram 900 for the real-time implementation of the apparatus 302 for reconstructing a distribution of a gas from a camera. For example, the apparatus 302 is implemented for the imaging of a greenhouse gas leak 902. The exemplary diagram 900 may include a mid-infrared light source 904, a single pixel camera 906, and the neural network 106. The single pixel camera 906 may include two objective lenses, such as a lens 908 and a lens 912. The single pixel camera 906 may further include a digital micromirror device (DMD) 910 and a photodetector 914.

The DMD 910 the light from the gas scene and projects it through the lens 912 onto the photodetector 914. The DMD 910 changes an orientation of its mirrors at a high frequency resulting in a series of measurements 920 of the gas scene at every time instance.

The series of measurements 920 are then compared with measurement 918 using the DMD configuration of the reconstruction of the gas generated from the trained neural network 106. A reconstruction of the gas distribution 916 is refined in a way that minimizes a difference between the series of measurements 920 from the mid-infrared (MIR) sensors and the measurement 918 of the reconstruction of the gas.

The system 204, such as the air conditioning system may be described by the physics-based model called the Boussinesq equation, as exemplary illustrated in FIG. 4. However, the Boussinesq equation contains infinite dimensions to resolve the Boussinesq equation for controlling the air-conditioning system. Data assimilation may also be added to the ODE model. The model reproduces the dynamics (for instance, an airflow dynamics) of the air conditioning system in an optimal manner. Further, in some embodiments, the model of the air flow dynamics connects the values of the air flow (for instance, the velocity of the air flow) and the temperature of the air conditioned room during the operation of the air conditioning system. Moreover, the apparatus 302 optimally controls the air-conditioning system to generate the airflow in a conditioned manner.

Figure 10:
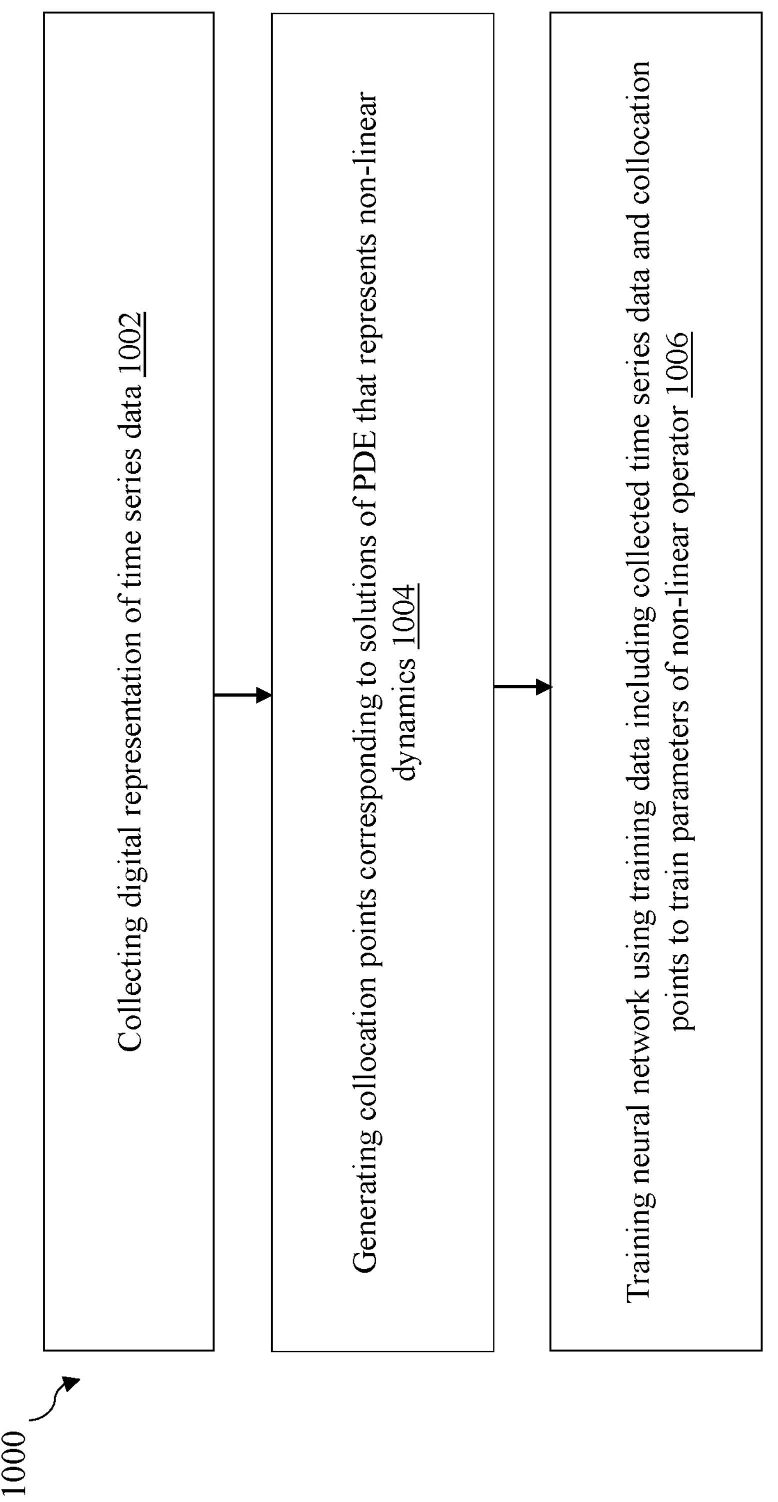
FIG. 10 illustrates a flow chart depicting a method for training the neural network, according to some embodiments of the present disclosure.

FIG. 10 illustrates a flow chart 1000 depicting a method for training the neural network 106, according to some embodiments of the present disclosure. The flow chart 1000 may include steps 1002, 1004 and 1006. Fewer or more steps may be provided. Additionally, one or more steps may be combined or split, without departure from the scope of the disclosure.

At step 1002, the method may include collecting the digital representation of time series data 116. The digital representation of time series data 116 indicates instances of the function space of the system and corresponding measurements of the state of the operation of the system at different instances of time. The collection of the digital representation of time series data 116 by the CFD simulation or experiments module 112 is further described, for example, in FIG. 1A.

At step 1004, the method may include generating the collocation points 118 corresponding to solutions of the PDE that represents the non-linear dynamics for the set of initial and boundary conditions on the state of the operation of the system and constraints on the operation of the system evolving from the boundary conditions according to the PDEs. In some embodiments, the generation of the collocation points 118 may be based on the subset of the set of initial and boundary conditions with the structure reducing the complexity of solving the PDE. The generation of the collocation points 118 may be further based on the functional space of the system satisfying the subset of the initial and boundary conditions. Details of the generation of the collocation points 118 are further provided, for example, in FIG. 1D.

At step 1006, the method may include training the neural network 106 may further include training the neural network 106 using the training data including the collected digital representation of the time series data 116 and the collocation points 118 to train the parameters of the non-linear operator 110. The encoder ($\Psi$) of the autoencoder 108 may be configured to encode each instance of the training data into the latent space. Further, the non-linear operator (h) 110 may be configured to propagate the encoded instances of the training data into the latent space with transformation determined by the parameters of the non-linear operator 110. The decoder ($\psi^{-1}$) of the autoencoder 108 may be configured to decode the transformed encoded instances of the training data to minimize the hybrid loss function (corresponding to the hybrid loss 134) including the data-driven loss 130 between the decodings of the neural network 106 and the digital representation of the time series data 116 and the physics-informed loss 132 between the decodings of the neural network 106 and solutions of the PDEs at the collocation points 118. Details of training of the neural network 106 are further provided, for example, in FIG. 1B.

The above description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, if understood by one of ordinary skill in the art, the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Individual embodiments above are described as a process which is depicted as a flowchart, a flow diagram, a data flow diagram, a structure diagram, or a block diagram. Although a flowchart shows the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Many modifications and other embodiments of the disclosure set forth herein will come to mind to one skilled in the art to which these disclosure pertain having the benefit of the teachings presented in the foregoing descriptions and the associated drawings. It is to be understood that the disclosure are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method of training a neural network for controlling an operation of a system having non-linear dynamics represented by partial differential equations (PDEs), wherein the neural network includes a non-linear operator of the dynamics of the system represented in a latent space by parameterized ordinary differential equations (ODEs) with parameters determined by the training, the method comprising:

collecting a digital representation of time series data indicative of instances of a function space of the system and corresponding measurements of a state of the operation of the system at different instances of time;

generating collocation points corresponding to solutions of the PDE that represents the non-linear dynamics for a set of initial and boundary conditions on the state of the operation of the system and constraints on the operation of the system evolving from the boundary conditions according to the PDEs; and training the neural network using training data including the collected time series data and the collocation points to train the parameters of the non-linear operator, wherein the neural network has an autoencoder architecture including an encoder configured to encode each instance of the training data into a latent space, the non-linear operator configured to propagate the encoded instances of the training data into the latent space with transformation determined by the parameters of the non-linear operator, and a decoder configured to decode the transformed encoded instances of the training data to minimize a hybrid loss function including data-driven loss between the decodings of the neural network and the collected time series data and physics-informed loss between the decodings of the neural network and solutions of the PDEs at the collocation points.

2. The method of claim 1, wherein the generation of the collocation points is based on:

a subset of the set of initial and boundary conditions with a structure reducing a complexity of solving the PDE; and a functional space of the system satisfying the subset of the initial and boundary conditions.

3. The method of claim 2, wherein the structure of the subset of the initial and boundary conditions includes at least one of: sinusoidal functions, harmonic functions, periodic functions, or exponential functions.

4. The method of claim 1, wherein the parameters of the non-linear operator are determined based on a probablistic approach.

5. The method of claim 1, wherein the non-linear operator is based on a continuous-time dynamical system.

6. The method of claim 1, further comprising fine-tuning the parameters of the non-linear operator in real-time, based on a set of expected measurements and an output of the neural network.

7. The method of claim 1, further comprising generating estimation and control commands for controlling the operation of the system.

8. The method of claim 7, wherein the generation of the estimation and control commands for controlling the operation of the system is based on a model-based control and estimation technique.

9. The method of claim 7, wherein the generation of the estimation and control commands for controlling the operation of the system is based on an optimization-based control and estimation technique.

10. The method of claim 7, wherein the generation of the estimation and control commands for controlling the operation of the system is based on a data-driven based control and estimation technique.

11. The method of claim 1, further comprising generating the parameterized ODEs based on one or more model reduction techniques, wherein the one or more model reduction techniques comprises at least one of: proper orthogonal decomposition (POD)-Galerkin projection method, or dynamic mode decomposition (DMD) method.

12. The method of claim 1, further comprising obtaining the digital representation of time series data based on use of computational fluid dynamics (CFD) simulation and experiments.

13. A training system for training of a neural network for controlling an operation of a system having non-linear dynamics represented by partial differential equations (PDEs), wherein the neural network includes a non-linear operator of the dynamics of the system represented in a latent space by parameterized ordinary differential equations (ODEs) with parameters determined by the training, the training system comprising at least one processor; and a memory having instructions stored thereon that, when executed by the at least one processor, cause the training system to:

collect a digital representation of time series data indicative of instances of a function space of the system and corresponding measurements of a state of the operation of the system at different instances of time;

generate collocation points corresponding to solutions of the PDE that represents the non-linear dynamics for a set of initial and boundary conditions on the state of the operation of the system and constraints on the operation of the system evolving from the boundary conditions according to the PDEs; and train the neural network using training data including the collected time series data and the collocation points to train the parameters of the non-linear operator, wherein the neural network has an autoencoder architecture including an encoder configured to encode each instance of the training data into a latent space, the non-linear operator configured to propagate the encoded instances of the training data into the latent space with transformation determined by the parameters of the non-linear operator, and a decoder configured to decode the transformed encoded instances of the training data to minimize a hybrid loss function including data-driven loss between the decodings of the neural network and the collected time series data and physics-informed loss between the decodings of the neural network and solutions of the PDEs at the collocation points.

14. The training system of claim 13, wherein the generation of the collocation points is based on:

a subset of the set of initial and boundary conditions with a structure reducing a complexity of solving the PDE; and a functional space of the system satisfying the subset of the initial and boundary conditions.

15. The training system of claim 14, wherein the structure of the subset of the initial and boundary conditions includes at least one of: sinusoidal functions, harmonic functions, periodic functions, or exponential functions.

16. The training system of claim 13, wherein the parameters of the non-linear operator are determined based on a probablistic approach.

17. The training system of claim 13, wherein the non-linear operator is based on a continuous-time dynamical system.

18. The training system of claim 13, wherein the training system is further configured to fine-tune the parameters of the non-linear operator in real-time, based on a set of expected measurements and an output of the the neural network.

19. The training system of claim 13, wherein the training system is further configured to generate estimation and control commands for controlling the operation of the system.

20. A non-transitory computer readable storage medium embodied thereon a program executable by a processor for performing a method for controlling an operation of a system having non-linear dynamics represented by partial differential equations (PDEs), wherein the neural network includes a non-linear operator of the dynamics of the system represented in a latent space by parameterized ordinary differential equations (ODEs) with parameters determined by the training, the method comprising:

collecting a digital representation of time series data indicative of instances of a function space of the system and corresponding measurements of a state of the operation of the system at different instances of time;

generating collocation points corresponding to solutions of the PDE that represents the non-linear dynamics for a set of initial and boundary conditions on the state of the operation of the system and constraints on the operation of the system evolving from the boundary conditions according to the PDEs; and training the neural network using training data including the collected time series data and the collocation points to train the parameters of the non-linear operator, wherein the neural network has an autoencoder architecture including an encoder configured to encode each instance of the training data into a latent space, the non-linear operator configured to propagate the encoded instances of the training data into the latent space with transformation determined by the parameters of the non-linear operator, and a decoder configured to decode the transformed encoded instances of the training data to minimize a hybrid loss function including data-driven loss between the decodings of the neural network and the collected time series data and physics-informed loss between the decodings of the neural network and solutions of the PDEs at the collocation points.

* * * * *